US006877906B2

(12) United States Patent
Mizukami et al.

(10) Patent No.: US 6,877,906 B2
(45) Date of Patent: Apr. 12, 2005

(54) OPTICAL FIBER CROSS-CONNECT WITH A CONNECTION BLOCK, AN ALIGNMENT BLOCK AND A HANDLING DEVICE

(75) Inventors: Masato Mizukami, Hachiouji (JP); Kunihiko Sasakura, Higashimurayama (JP); Kazumasa Kaneko, Fuchu (JP); Yoshitaka Enomoto, Tsukuba (JP)

(73) Assignee: Nippon Telegraph and Telephone, Tokyo (JP)

( * ) Notice: Subject to any disclaimer, the term of this patent is extended or adjusted under 35 U.S.C. 154(b) by 0 days.

(21) Appl. No.: 10/648,822

(22) Filed: Aug. 26, 2003

(65) Prior Publication Data

US 2004/0076377 A1 Apr. 22, 2004

(30) Foreign Application Priority Data

Aug. 30, 2002 (JP) ........................................ 2002-255118
Sep. 13, 2002 (JP) ........................................ 2002-267958

(51) Int. Cl.[7] ............................... G02B 6/38; G02B 6/36
(52) U.S. Cl. ............................ 385/55; 385/77; 385/86; 385/88
(58) Field of Search ............................ 385/55, 63, 77, 385/73, 86, 88

(56) References Cited

U.S. PATENT DOCUMENTS

| 5,666,449 A | 9/1997 | Sawae et al. | |
| 6,604,861 B2 * | 8/2003 | Chen et al. | 385/56 |
| 6,663,293 B2 * | 12/2003 | Lampert et al. | 385/78 |
| 2004/0047566 A1 * | 3/2004 | McDonald et al. | 385/78 |
| 2004/0136677 A1 * | 7/2004 | Morellec et al. | 385/135 |

FOREIGN PATENT DOCUMENTS

| EP | 1072916 A1 | 1/2001 |
| JP | 07318820 A | 12/1995 |
| JP | 2002116392 A | 4/2002 |

OTHER PUBLICATIONS

Kunihiko Sasakura, et al., *Automated Optical Fiber Cabling System for Intelligent Buildings*, International Wire & Cable Symposium Proceedings 1999, pp. 364–369.

Abstract of Japanese Publication No. 02250019, published Oct. 5, 1990.

Abstract of Japanese Publication No. 07318820, published Dec. 8, 1995.

Abstract of Japanese Publication No. 06242349, published Sep. 2, 1994.

O. Sezerman et al., "*Accurate alignment preserves polarization,*" Laser Focus World, Pennwell Publishing, USA, Dec. 1997, pp. S27–S30.

* cited by examiner

Primary Examiner—Chandrika Prasad
(74) Attorney, Agent, or Firm—Workman Nydegger

(57) ABSTRACT

An optical connector plug according to the present invention which is joined to a front end of an optical fiber cord covering an optical fiber and which is removably inserted to one end of an optical adapter having a locking member for locking the optical connector plug in an engaged state, includes an inserted portion removably inserted to one end of the optical adapter, a plug body joined to a front end of the optical fiber cord, a locking portion formed between the plug body and the inserted portion and locked by the locking member of the optical adapter, and a rotational phase reference surface formed on the plug body away from the locking portion. The optical connector plug according to the present invention can be applied to APC optical connector plug, secure high reliability for optical cross-connecting, and also reduce cost.

3 Claims, 19 Drawing Sheets

OPTICAL FIBER CROSS-CONNECT WITH A CONNECTION BLOCK, AN ALIGNMENT BLOCK AND A HANDLING DEVICE

This application claims priority from Japanese Patent Application Nos. 2002-255118 filed Aug. 30, 2002 and 2002-267958 filed Sep. 13, 2002, which are incorporated hereinto by reference.

BACKGROUND OF THE INVENTION

1. Field of the Invention

The present invention relates to an optical connector plug, an optical connector plug connecting method, an optical fiber cross-connection apparatus, an optical fiber cord retracting method, an optical fiber cord retraction device, and an optical connector plug alignment block all used in a cross-connecting operation in an optical network that is performed by automatically connecting or disconnecting optical fibers through the optical connector plugs by using a handling device.

2. Description of the Related Art

An optical fiber cross-connection apparatus connects or disconnects given optical fibers in a group of operated-side optical fibers to and from a group of stationary-side optical fibers. One such optical fiber cross-connection apparatus that auto-mates the optical cross-connecting operation by using a handling device has been proposed in Japanese Patent Application Laid-open No. 7-318820 (1995). In this optical fiber cross-connection apparatus, the handling device connects and disconnects optical connector plugs connected to front end portions of optical fiber cords by freely moving in a three-dimensional space through a moving means that is movable in an X-direction along a horizontal plane, in a Y-direction perpendicular to the X-direction and along the horizontal plane and in a Z-direction along a vertical direction.

A schematic plan view of a conventional optical fiber cross-connection apparatus is shown in FIG. 33 and its side view in FIG. 34. In FIG. 33 and FIG. 34, the optical fiber cross-connection apparatus 100 has a connection block 103, an optical connector plug alignment block 104, a handling system 105, an actuating system 108, an optical fiber cord retraction device 106, and a redundant cord storage unit 107. The connection block 103 has a plurality of optical adapters 111 for connecting optical connector plugs 110, each joined with an optical fiber cord 101 on an output side, to optical connector plugs 109 each joined with an optical fiber cord 102 on an input side. The optical connector plug alignment block 104 is arranged to oppose the connection block 103 and has an array of support holes to hold the optical connector plugs 109 of the input-side optical fiber cords 102 in a predetermined alignment. The handling system 105 holds an optical connector plug 109 to draw out the optical fiber cord 102 from the optical connector plug alignment block 104 and connects and disconnects the optical connector plug 109 to and from the optical adapter 111. The actuating system 108 moves the handling system 105 to a given position on the connection block 103 and the optical connector plug alignment block 104. The optical fiber cord retraction device 106 retracts rearwardly of the optical connector plug alignment block 104 the optical fiber cord 102 whose optical connector plug 109 was pulled out of the optical adapter 111. The redundant cord storage unit 107 accommodates the optical fiber cord 102 being retracted.

The optical fiber cord retraction device 106 has a retraction roller 106a that carries the input-side optical fiber cords 102 and an idle roller 106b disposed above the retraction rollers 106a and moved along the axis of the retraction roller 106a by the actuating system 108.

The conventional optical fiber cross-connection apparatus 100 cross-connects of optical fiber cords in the following steps. First, optical fiber cords 102 whose optical connector plugs 109 were disconnected from the optical adapters 111 in the connection block 103 by the handling system 105 are retracted rearward of the optical connector plug alignment block 104 by the retraction roller 106a and the idle roller 106b of the optical fiber cord retraction device 106 toward the redundant cord storage unit 107 which accommodates the cord. At the same time, the optical connector plugs 109 joined at the ends of the optical fiber cords 102 are received in a predetermined alignment into the support holes in the optical connector plug alignment block 104.

When the optical connector plugs 109 received in the optical connector plug alignment block 104 are moved to the connection block 103, a given optical connector plug 109 of an optical fiber cord 102 is pulled out of the optical connector plug alignment block 104 by the handling system 105 through the actuating system 108 and is set to face a given optical adapter 111 on the connection block 103 and inserted to it, thus completing the cross-connection of the optical fiber cord 102.

In the conventional optical fiber cross-connection apparatus, there is a room for further improvements as follows. That is, in an optical network, when it is desired to minimize adverse effects of a reflected light produced as a result of inserting an optical module, angled physical contact (APC) optical connector plugs are used which have their connecting end surface polished at a predetermined angle to a plane perpendicular to a light axis. Thus, where the APC optical connector plugs are used on the conventional optical fiber cross-connection apparatus, since optical connector plugs need to be connected such that their connecting end surfaces contact each other in a parallel state, the attitudes of the optical connector plugs as they are inserted into the connection block are not uniquely determined. This makes it difficult to apply the conventional structure as is to the APC optical connector plugs.

Further, when an optical connector plug is inserted into the optical adapter with the plug attitude rotated from a connection attitude in which the optical connector plug can be connected or when the optical connector plug inserted in the optical adapter is applied a rotating force, expected optical characteristics, such as a desired insertion loss, may not be obtained.

There is another problem with the conventional optical fiber cross-connection apparatus. When an optical connector plug is pulled out from the optical adapter of the connection block by a handling device and its optical fiber cord is retracted by the optical fiber cord retraction device to be accommodated in the redundant cord storage unit, a flange of the optical connector plug may get entangled and caught by other cords, rendering a normal retraction of the cord impossible.

Further, the conventional optical fiber cross-connection apparatus or the optical fiber cord retraction device has the following problem that needs to be addressed. That is, optical fiber cords are subjected to repetitive retracting operations as they are retracted back toward the redundant cord storage unit by the optical fiber cord retraction device and also to repetitive feeding operations as the optical connector plugs are drawn forward from the optical connector plug alignment block by the handling system. Thus, the optical fiber cords may develop persisting physical distortions, such as twists and bends. Therefore, if the optical fiber cords are moved forward and backward by holding them between the retraction roller and idle roller, they may get dislocated from between the retraction roller and idle roller due to their physical distortions, such as twists and bends.

Further, depending on a distance between the provided positions of the optical connector plug alignment block and the redundant cord storage unit, the optical fiber cords that are being retracted by the optical fiber cord retraction device into the redundant cord storage unit may not be normally accommodated into the unit.

SUMMARY OF THE INVENTION

A first object of the present invention is to provide an optical connector plug, an optical connector plug connecting method, an optical fiber cross-connection apparatus, an optical fiber cord retracting method, an optical fiber cord retraction device, and an optical connector plug alignment block, all of which can be applied to an optical connection at a specified position, as in an APC optical connector plug, secure high reliability for optical cross-connecting, eliminate entanglement during cord windup, and reduce cost.

A second object of the present invention is to provide an optical fiber cross-connection apparatus, an optical fiber cord retracting method and an optical fiber cord retraction device, all of which can prevent optical fiber cords from getting dislocated from between a retraction roller and an idle roller even after the optical fiber cords have been subjected to repetitive retraction operations, and which ensure that the retracted optical fiber cords are accommodated in the redundant cord storage unit, thus enhancing reliability of the optical cross-connecting operation.

A first aspect of the present invention is an optical connector plug joined to a front end of an optical fiber cord covering an optical fiber and removably inserted to one end of an optical adapter having a locking member for locking the optical connector plug in an engaged state, the optical connector plug comprises an inserted portion removably inserted to one end of the optical adapter, a plug body joined to a front end of the optical fiber cord, a locking portion formed between the plug body and the inserted portion and locked by the locking member of the optical adapter, and a rotational phase reference surface formed on the plug body away from the locking portion.

In the optical connector plug according to the first aspect of the present invention, the inserted portion is inserted into one end of the optical adapter in such a manner that the rotational phase reference surface of the optical connector plug has a predetermined positional relation with respect to the optical adapter. The locking member of the optical adapter engages with a locking portion of the optical connector plug to integrally connect the plug to the optical adapter.

According to the optical connector plug which is the first aspect of the present invention, not only can the plug be set to a predetermined rotational position relative to the optical adapter by using the rotational phase reference surface of the plug, but the plug can also be inserted firmly to the optical adapter by engaging the locking portion with the locking member of the optical adapter. It is thus possible to secure a highly reliable optical connection even in the case of the APC optical connector plug.

In the optical connector plug according to the first aspect of the present invention, the optical connector plug may further comprise a flange portion formed between the inserted portion and the plug body and having a larger diameter than those of the inserted portion and the plug body, a tapered portion formed between the flange portion and the plug body and having a conical inclined surface tapering from the flange portion toward the plug body, and a notched portion formed in the tapered portion in association with the rotational phase reference surface and adjoining to the flange portion, the notched portion may act as the locking portion. In this case, when the locking member of the optical adapter is disengaged from the locking portion of the optical connector plug and the plug is pulled out of the optical adapter and moved rearwardly, other optical fiber cords lying nearby do not catch a flange portion of the plug being retracted but ride over a tapered portion of the plug, allowing the optical connector plug to be retracted smoothly. Further, by engaging a notched portion with the locking member, the operated-side optical connector plug can also be blocked from rotating relative to the optical adapter, ensuring a more reliable fixing of the optical connector plug with respect to the optical adapter.

The rotational phase reference surface may be a pair of mutually parallel planes separated 180 degrees apart along a circumference of the plug body. In this case, the optical connector plug can easily be kept in a predetermined rotational position or alignment by gripping the plug at the rotational phase reference surface.

The optical fiber cord may have a cross-sectional shape such that its dimension along a first direction perpendicular to a longitudinal direction of the cord and its dimension along a second direction perpendicular to the longitudinal direction and the first direction differ from each other, the plug body may be joined to the front end of the optical fiber cord with the first and second directions associated with the rotational phase reference surface. In this case, when the optical connector plug joins to the front end of the optical fiber cord, the rotary phase of the optical fiber cord can easily be matched to the rotational phase reference surface of the optical connector plug.

The optical fiber may have a connecting end surface inclined with respect to an optical axis of the fiber and the rotational phase reference surface is formed in association with a direction of inclination of the connecting end surface of the optical fiber. In this case, it is possible to realize a highly reliable optical connection even when the optical connector plug is an APC optical connector plug.

A second aspect of the present invention is an optical connector plug connecting method for optically connecting a given operated-side optical connector plug to a given stationary-side optical connector plug for optical connection by moving the operated-side optical connector plug between a connection block and an optical connector plug alignment block, wherein the connection block has a plurality of optical adapters arranged in a predetermined alignment, to first ends of which are inserted the stationary-side optical connector plugs joined to front ends of stationary-side optical fiber cords, wherein the optical connector plug alignment block has a plurality of guide passages formed therein in a predetermined alignment which can hold a plurality of operated-side optical connector plugs to be removably inserted in second ends of the optical adapters for optical connection with the stationary-side optical connector plugs and which allow a plurality of operated-side optical fiber cords joined at their front ends with the operated-side optical connector plugs to pass therethrough, wherein the operated-side optical connector plugs each have a rotational phase reference surface, the optical connector plug connecting method comprises the steps of gripping with a handling device the rotational phase reference surface of the given operated-side optical connector plug held in the optical connector plug alignment block, moving the operated-side optical connector plug gripped by the handling device toward the connection block, putting the operated-side optical connector plug gripped by the handling device opposite the given stationary-side optical connector plug held in the connection block, and inserting the operated-side optical connector plug gripped by the handling device into the second end of the optical adapter in a state such that the rotational phase reference surface of the operated-side optical connector plug is associated with the stationary-side optical connector plug.

According to the optical connector plug connecting method which is the second aspect of the present invention, the rotational phase reference surface of the given operated-side optical connector plug held in the optical connector plug alignment block is gripped by the handling device to set the plug to a predetermined rotational phase with respect to the optical adapter at all times. This realizes a highly reliable optical connection, even with an APC optical connector plug.

In the optical connector plug connecting method according to the second aspect of the present invention, the step of moving the operated-side optical connector plug toward the connection block may be performed away from a cord stretching plane in which the plurality of operated-side optical fiber cords extend between the connection block and the optical connector plug alignment block. In this case, the operated-side optical connector plug to be connected can be moved toward the connection block without being interfered with by other operated-side optical fiber cords lying in the cord stretching plane.

A third aspect of the present invention is an optical fiber cross-connection apparatus which comprises a connection block having a plurality of optical adapters arranged in a predetermined alignment, to first ends of which are inserted stationary-side optical connector plugs joined to front ends of stationary-side optical fiber cords and to second ends of which are removably inserted operated-side optical connector plugs for optical connection with the stationary-side optical connector plug, a plurality of locking members provided to the connection block to lock the operated-side optical connector plugs to the optical adapters, an optical connector plug alignment block having a plurality of guide passages formed therein in a predetermined alignment which allow a plurality of operated-side optical fiber cords to pass therethrough so that the operated-side optical connector plugs are lain between the optical connector plug alignment block and the connection block, and a handling device to act on the locking member to unlocking the operated-side optical connector plug from the optical adapter, and to grip the operated-side optical connector plug held in the optical connector plug alignment block and insert it into the given optical adapter, wherein the optical connector plug has an inserted portion removably inserted into one end of the optical adapter, a plug body joined to a front end of the optical fiber cord, a locking portion formed between the plug body and the inserted portion and engaged by the locking member, and a rotational phase reference surface formed in the plug body away from the inserted portion and gripped by the handling device.

In the optical fiber cross-connection apparatus according to a third aspect of this invention, the handling device operates the locking member to unlock an operated-side optical connector plug from the optical adapter, after which the operated-side optical connector plug is moved toward the optical connector plug alignment block. Conversely, in making an optical connection, the handling device grips the rotational phase reference surface of the given operated-side optical connector plug held in the optical connector plug alignment block and then inserts the plug into one end of the given optical adapter, causing the locking member of the optical adapter to engage with the locking portion, thus integrally connecting the operated-side optical connector plug to the optical adapter.

According to the optical fiber cross-connection apparatus which is the third aspect of the present invention, the given operated-side optical connector plug can be set to the predetermined rotational phase with respect to the optical adapter at all times by gripping with the handling device the rotational phase reference surface of the plug held in the optical connector plug alignment block. It is thus possible to realize a highly reliable optical connection, even with an APC optical connector plug.

In the optical fiber cross-connection apparatus according to the third aspect of the present invention, the optical fiber cord may have a cross-sectional shape such that its dimension along a first direction perpendicular to a longitudinal direction of the cord and its dimension along a second direction perpendicular to the longitudinal direction and the first direction differ from each other, wherein the plug body may be joined to a front end of the optical fiber cord with the first and second directions associated with the rotational phase reference surface, wherein the guide passages in the optical connector plug alignment block may have a cross-sectional shape corresponding to that of the optical fiber cord. In this case, when the operated-side optical connector plug joins to the front end of the optical fiber cord, the rotary phase of the optical fiber cord can easily be matched to the rotational phase reference surface of the optical connector plug. Further, since the rotational position of the operated-side optical connector plug held in the optical connector plug alignment block can be kept in a predetermined alignment by using the cross-sectional shape of the optical fiber cord and the corresponding guide passage in the optical connector plug alignment block, the handling device can grip the rotational phase reference surface of the operated-side optical connector plug easily and reliably.

A fourth aspect of the present invention is an optical fiber cross-connection apparatus which comprises a connection block having a plurality of optical adapters arranged in a predetermined alignment, to first ends of which are inserted stationary-side optical connector plugs joined to front ends of stationary-side optical fiber cords and to second ends of which are removably inserted operated-side optical connector plugs for optical connection with the stationary-side optical connector plug, a plurality of locking members provided to the connection block to lock the operated-side optical connector plugs to the optical adapters, a redundant cord storage unit into which an operated-side optical fiber cord joined at its front end with the operated-side optical connector plug is retracted after the operated-side optical connector plug is optically disconnected from the stationary-side optical connector plug, an optical connector plug alignment block provided between the redundant cord storage unit and the connection block and having a plurality of guide passages formed therein in a predetermined alignment which allow the plurality of operated-side optical fiber cords to pass therethrough so that the operated-side optical connector plugs are lain between the optical connector plug alignment block and the connection block, an optical fiber cord retraction means provided between the optical connector plug alignment block and the redundant cord storage unit to retract the operated-side optical fiber cord of the optically disconnected operated-side optical connector plug into the redundant cord storage unit, and a handling device to act on the locking member to unlock the operated-side optical connector plug from the optical adapter, and to grip the operated-side optical connector plug held in the optical connector plug alignment block by the optical fiber cord retraction means and insert it into the given optical adapter, wherein the optical fiber cord retraction means has a retraction roller driven to rotate and having an outer circumferential surface formed with a plurality of guide grooves axially spaced at predetermined intervals, the guide grooves being adapted to hold individual operated-side optical fiber cords, a slider movable parallel to a rotating axis of the retraction roller, and a rotatable idle roller supported on the slider so that it can be moved toward and away from the retraction roller and adapted to hold between it and the retraction roller the operated-side optical fiber cord being retracted into the redundant cord storage unit.

In the optical fiber cross-connection apparatus according to the fourth aspect of the invention, the handling device operates the locking member to unlock the operated-side optical connector plug from the optical adapter, after which an optical fiber cord retraction means is activated to move the operated-side optical connector plug toward the optical connector plug alignment block to retract the optical fiber cord of the plug into the redundant cord storage unit. At this time, the optical fiber cord is kept held in the guide groove of the retraction roller as it is retracted into the redundant cord storage unit. For optical connection, the above process is reversed. That is, the handling device grips the given operated-side optical connector plug held in the optical connector plug alignment block and then inserts the plug into one end of the given optical adapter, causing the locking member of the optical adapter to engage with the locking portion, thus integrally connecting the operated-side optical connector plug to the optical adapter. At this time, the optical fiber cord is held in the guide groove of the retraction roller as it is drawn from the redundant cord storage unit.

According to the optical fiber cross-connection apparatus which is the fourth aspect of the present invention, since the operated-side optical fiber cord is held in the guide groove of the retraction roller as it is retracted or drawn, if the cord develops lasting deformations such as twisting and bending, the operated-side optical fiber cord can be prevented from being dislocated from between the retraction roller and the idle roller, thus assuring a reliable cross-connection of the optical connector plug.

A fifth aspect of the present invention is an optical fiber cord retracting method for retracting an operated-side optical fiber cord joined at its front end with an operated-side optical connector plug into a redundant cord storage unit after the operated-side optical connector plug is optically disconnected from a stationary-side optical connector plug, wherein an optical connector plug alignment block is provided between the stationary-side optical connector plug and the redundant cord storage unit, wherein the optical connector plug alignment block has a plurality of guide passages formed therein in a predetermined alignment which allow a plurality of the operated-side optical fiber cords to pass therethrough, wherein the operated-side optical connector plugs are lain between the stationary-side optical connector plugs and the optical connector plug alignment block, wherein the operated-side optical fiber cords have a cross-sectional shape such that its dimension along a first direction perpendicular to a longitudinal direction of the cord is larger than its dimension along a second direction perpendicular to the longitudinal direction and the first direction and the operated-side optical fiber cords are held between the stationary-side optical connector plugs and the optical connector plug alignment block so that the first direction of the cords is vertical, the optical fiber cord retracting method comprises the steps of twisting the operated-side optical fiber cords between the optical connector plug alignment block and the redundant cord storage unit so that the first direction is horizontal, and retracting the operated-side optical fiber cords into the redundant cord storage unit with the first direction of the cords set horizontal.

In the optical fiber cord retracting method according to the fifth aspect of the present invention, when the operated-side optical connector plug pulled out of the optical adapter is retracted toward the optical connector plug alignment block and its optical fiber cord is retracted into the redundant cord storage unit, the operated-side optical fiber cord is twisted between the optical connector plug alignment block and the redundant cord storage unit until a first direction of the cord is horizontal. As a result, the operated-side optical fiber cord is retracted into the redundant cord storage unit with its first direction set horizontal, a condition in which the cord can be folded easily.

According to the optical fiber cord retracting method which is the fifth aspect of the present invention, since the operated-side optical fiber cord is twisted between the optical connector plug alignment block and the redundant cord storage unit until the first direction of the cord is horizontal, and the operated-side optical fiber cord is retracted into the redundant cord storage unit with the first direction kept horizontal, the operated-side optical fiber cord is stored in the redundant cord storage unit with the cord's first direction kept a horizontal condition that allows the cord to be folded easily. Therefore, the operated-side optical fiber cord can be efficiently stored in the redundant cord storage unit. Further, since the operated-side optical connector plug is held in the optical connector plug alignment block with its first direction kept vertical, the operated-side optical connector plug can be kept almost in a predetermined rotational position, assuring a highly reliable plug cross-connecting operation.

A sixth aspect of the present invention is an optical fiber cord retracting method for retracting an operated-side optical fiber cord into a redundant cord storage unit by using a retraction roller and an idle roller after an operated-side optical connector plug joined to a front end of the operated-side optical fiber cord is optically disconnected from a stationary-side optical connector plug, wherein the retraction roller holds a plurality of the operated-side optical fiber cords in a predetermined alignment and the idle roller holds between it and the retraction roller the operated-side optical fiber cords, the optical fiber cord retracting method comprises the steps of moving the idle roller to a position facing the operated-side optical fiber cord to be retracted into the redundant cord storage unit, pressing the idle roller against the operated-side optical fiber cord to be retracted into the redundant cord storage unit so that the operated-side optical fiber cord is held between the idle roller and the retraction roller, and driving the retraction roller to retract the operated-side optical fiber cord held between the retraction roller and the idle roller into the redundant cord storage unit.

In an optical fiber cord retracting method according to a sixth aspect of the present invention, the idle roller is first moved to the position facing the operated-side optical fiber cord to be retracted into the redundant cord storage unit and then is pressed against the operated-side optical fiber cord to hold it between the idle roller and the retraction roller. This is followed by the driving of the retraction roller to reliably retract only the given operated-side optical fiber cord into the redundant cord storage unit.

According to the optical fiber cord retracting method which is the sixth aspect of the present invention, since the idle roller is moved to the position opposite the operated-side optical fiber cord to be retracted into the storage unit and pressed against the cord to hold it between the idle roller and the retraction roller, only the given operated-side optical fiber cord can be retracted reliably into the storage unit. Further, when a new operated-side optical connector plug is to be optically connected to the stationary-side optical connector plug, it is possible to stably draw out the operated-side optical fiber cord of the operated-side optical connector plug from the storage unit, without entangling the cord. This ensures a highly reliable operation of the plug cross-connecting.

A seventh aspect of the present invention is an optical fiber cord retraction device provided between a redundant cord storage unit and the optical connector plug alignment block to retract an operated-side optical fiber cord joined at its front end with an operated-side optical connector plug into the redundant cord storage unit after the operated-side optical connector plug is optically disconnected from a stationary-side optical connector plug, wherein the optical connector plug alignment block has a plurality of guide passages formed therein in a predetermined alignment which allow a plurality of the operated-side optical fiber cords to pass therethrough, wherein the operated-side optical connector plugs are lain on that side of the optical connector plug alignment block which is opposite the redundant cord storage unit, the optical fiber cord retraction device comprises a retraction roller driven to rotate and having an outer circumferential surface formed with a plurality of guide grooves axially spaced at predetermined intervals, the guide grooves being adapted to hold individual operated-side optical fiber cords, a slider movable parallel to a rotating axis of the retraction roller, and a rotatable idle roller supported on the slider so that it can be moved toward and away from the retraction roller and adapted to hold between it and the retraction roller the operated-side optical fiber cord being retracted into the redundant cord storage unit.

In an optical fiber cord retraction device according to a seventh aspect of the present invention, after the operated-side optical connector plug is optically disconnected from the stationary-side optical connector plug, the idle roller is moved to the position facing the operated-side optical fiber cord to be retracted into the redundant cord storage unit and is pressed against the operated-side optical fiber cord to push it against the guide groove in the retraction roller, after which the retraction roller is driven to cause only the given operated-side optical fiber cord to be reliably retracted, still held in the guide groove of the retraction roller, from the guide passage in the optical connector plug alignment block into the redundant cord storage unit.

According to the optical fiber cord retraction device which is the seventh aspect of the present invention, since the idle roller is moved to the position facing the operated-side optical fiber cord to be retracted into the storage unit and pressed against the operated-side cord held in the guide groove of the retraction roller to hold it between the idle roller and the retraction roller, only the given operated-side optical fiber cord can be reliably retracted into the storage unit. Further, when the new operated-side optical connector plug is to be optically connected to the stationary-side optical connector plug, the operated-side optical fiber cord of the operated-side optical connector plug can be drawn out stably from the storage unit without getting entangled. This ensures a highly reliable operation of the plug cross-connection.

In the optical fiber cord retraction device according to the seventh aspect of the present invention, the optical fiber cord retraction device may further comprise a guide block provided between the retraction roller and at least one of the optical connector plug alignment block and the redundant cord storage unit and having a plurality of guide passages formed therein in a predetermined alignment which allow a plurality of the operated-side optical fiber cords to pass therethrough. In this case, the idle roller ensures a smoother transfer of the operated-side optical fiber cord held in the guide groove of the retraction roller.

The guide grooves of the retraction roller may be smaller in width, as measured along the rotating axis of the retraction roller, than the operated-side optical fiber cords, or may be larger in width than the operated-side optical fiber cords and have a depth smaller than the width of the operated-side optical fiber cords as measured in a direction perpendicular to the rotating axis of the retraction roller. Alternatively, the guide grooves of the retraction roller are larger in width than the operated-side optical fiber cords and have a depth larger than the width of the operated-side optical fiber cords as measured in a direction perpendicular to the rotating axis of the retraction roller, wherein at least an outer circumferential portion of the idle roller may be smaller in width than the guide grooves. As above, appropriately setting a width and a depth of the guide groove in the retraction roller enables an operated-side optical fiber cord of an arbitrary cross-sectional shape to be stably held in the guide groove.

The guide passages in the guide block may extend perpendicular to the rotating axis of the retraction roller and tangential to the guide grooves. In this case, since the operated-side optical fiber cord held in the guide groove of the retraction roller by the idle roller is arranged in a straight line between the guide groove and a guide passage in the guide block, the cord can be stably moved without developing deformations such as twisting.

A eighth aspect of the present invention is an optical connector plug alignment block provided between a connection block and a redundant cord storage unit, wherein the connection block has a plurality of stationary-side optical connector plugs attached therein in a predetermined alignment which are to be optically connected with operated-side optical connector plugs, wherein the redundant cord storage unit accommodates operated-side optical fiber cords joined at their front ends with the operated-side optical connector plugs after the operated-side optical connector plugs have been optically disconnected from the stationary-side optical connector plugs, wherein the operated-side optical connector plugs are lain between the optical connector plug alignment block and the connection block, wherein the operated-side optical fiber cords have a cross-sectional shape such that its dimension along a first direction perpendicular to a longitudinal direction of the cords is larger than its dimension along a second direction perpendicular to the first direction and the longitudinal direction, the optical connector plug alignment block comprises a first alignment unit having a plurality of guide passages formed therein in a predetermined alignment which allow the operated-side optical fiber cords to pass therethrough so that the first direction of the operated-side optical fiber cords is vertical, and a second alignment unit provided between the first alignment unit and the redundant cord storage unit and having a plurality of guide passages formed therein in a predetermined alignment which allow the operated-side optical fiber cords to pass therethrough so that the first direction of the operated-side optical fiber cords is horizontal.

In an optical connector plug alignment block according to an eighth aspect of the invention, when the operated-side optical connector plug is pulled out from the optical adapter in the connection block and the operated-side optical fiber cord of the operated-side plug is retracted into the redundant cord storage unit, the operated-side optical fiber cord passes through the first alignment unit with the first direction of the cord aligned vertically and then passes through the second alignment unit with the cord's first direction aligned horizontally, so that the cord is twisted 90 degrees before being accommodated into the redundant cord storage unit. Since the first direction of the operated-side optical fiber cord is aligned by the guide passage in the first alignment unit such that the first direction of the operated-side optical fiber cord is vertical, the operated-side plug that has reached the guide passage in the first alignment unit can be held almost in a predetermined rotational position with respect to the first alignment unit.

According to the optical connector plug alignment block which is the eighth aspect of the present invention, since the operated-side optical fiber cord is accommodated into the redundant cord storage unit with the cord's first direction aligned a horizontally condition that facilitates the folding of the cord. Therefore, the operated-side optical fiber cord can be accommodated efficiently in the storage unit. Furthermore, since the operated-side optical connector plug is held in the optical connector plug alignment block with its first direction aligned vertically, the operated-side optical connector plug can be held almost in a predetermined rotational position, assuring a highly reliable plug cross-connecting operation.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
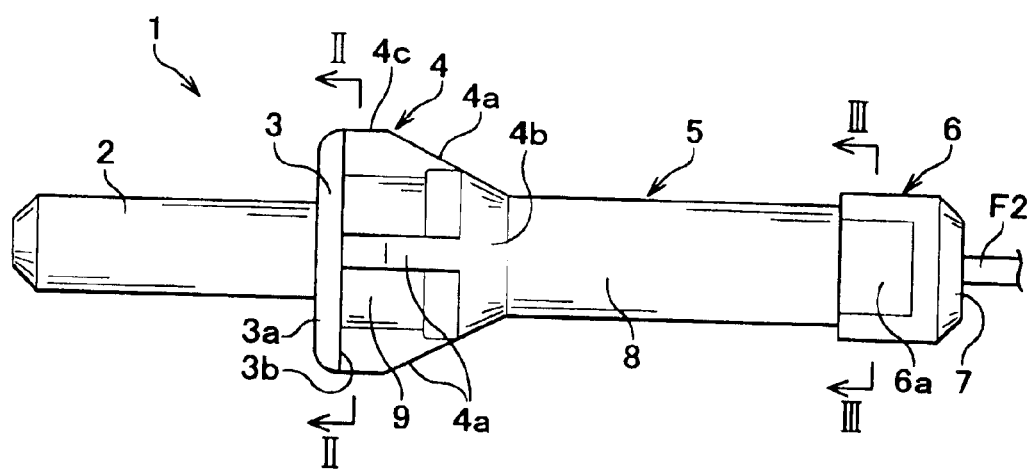
FIG. 1 is a side view showing an outline of one embodiment of an optical connector plug according to the present invention.
Figure 2:
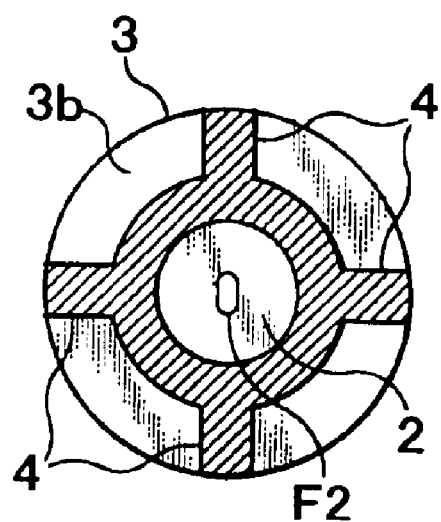
FIG. 2 is a cross-sectional view taken along the line II—II of FIG. 1.
Figure 3:
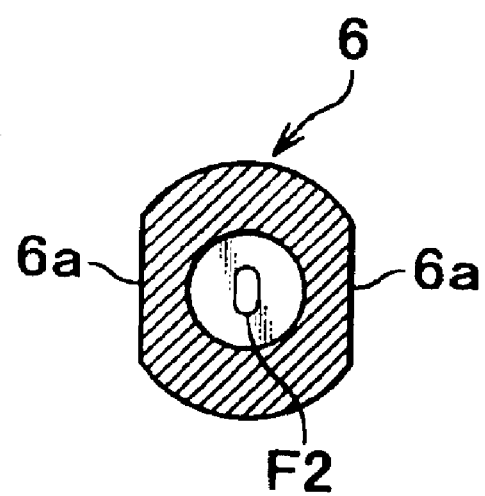
FIG. 3 is a cross-sectional view taken along the line III—III of FIG. 1.
Figure 4:
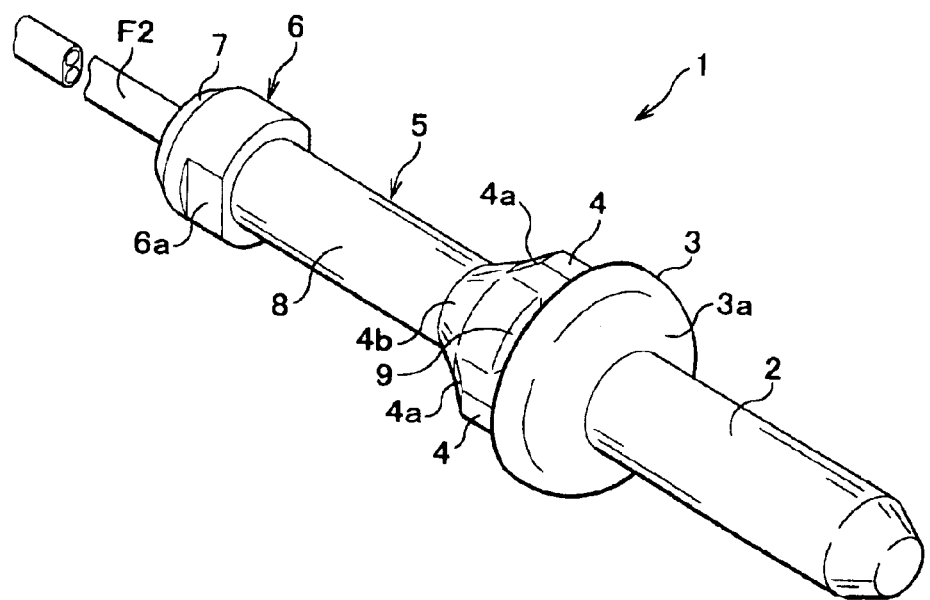
FIG. 4 is a perspective view of the optical connector plug of FIG. 1 as seen from the front.
Figure 5:
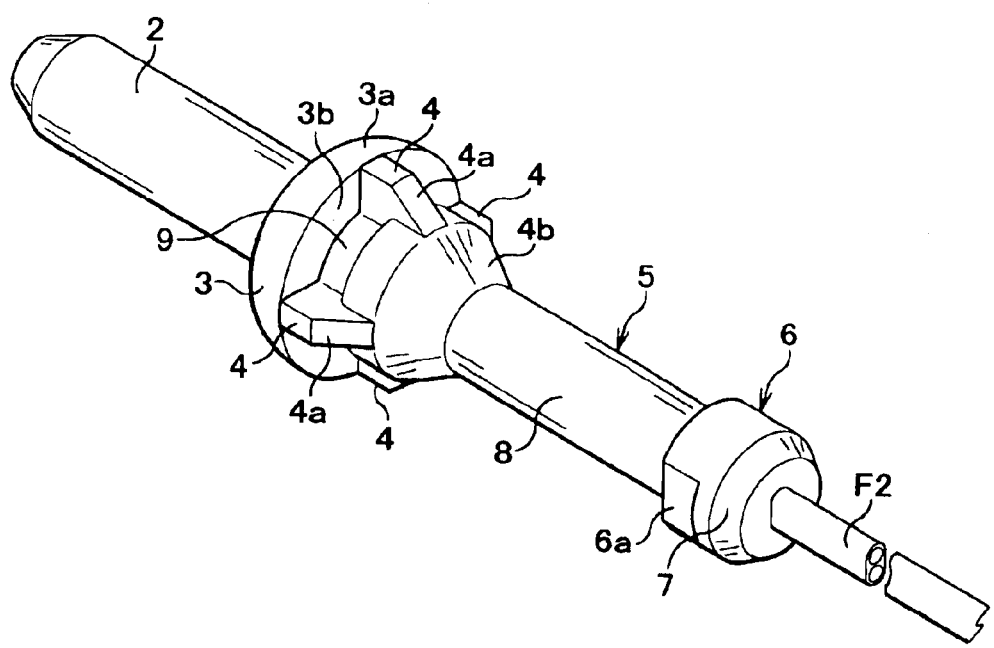
FIG. 5 is a perspective view of the optical connector plug of FIG. 1 as seen from the rear.
Figure 6:
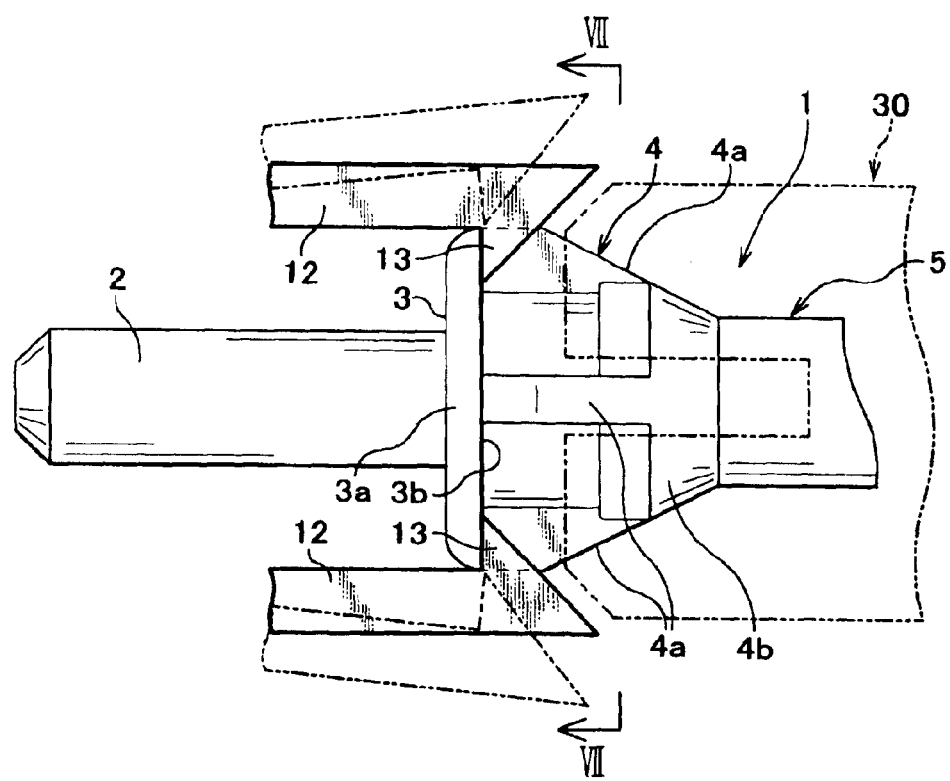
FIG. 6 is a side view showing the optical connector plug of FIG. 1 locked by a plug locking hook.
Figure 7:
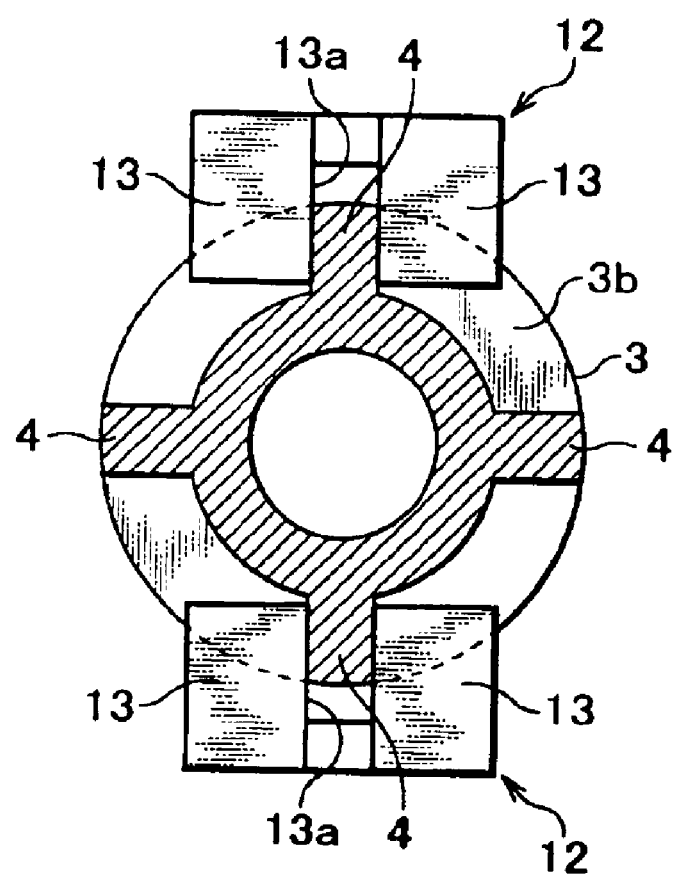
FIG. 7 is a cross-sectional view taken along the line VII—VII of FIG. 6.
Figure 8:
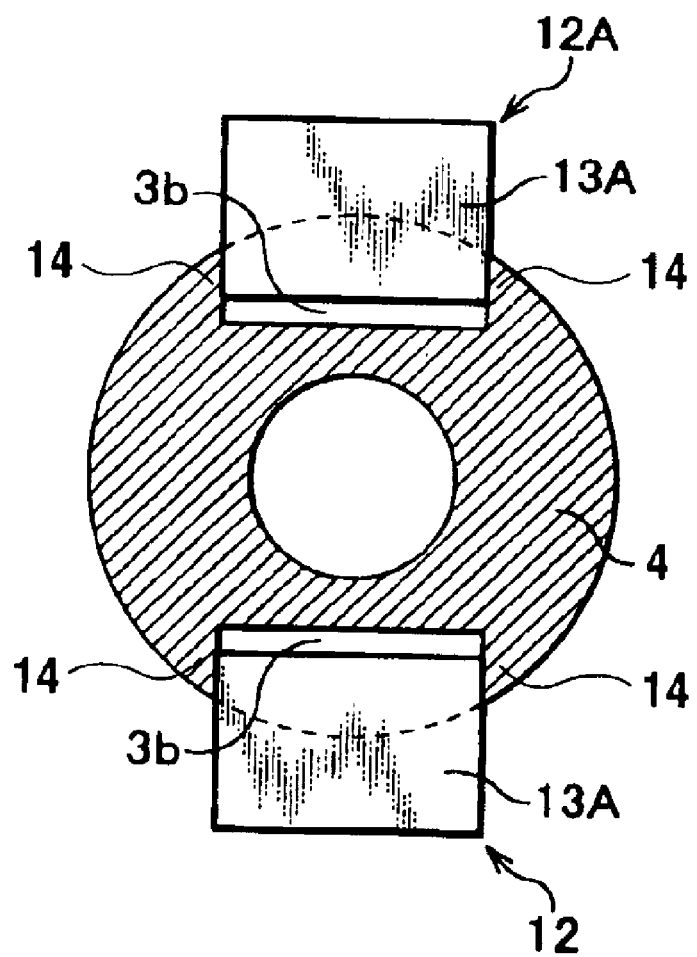
FIG. 8 is a cross-sectional view, similar to FIG. 7, of another embodiment of the present invention.
Figure 9:
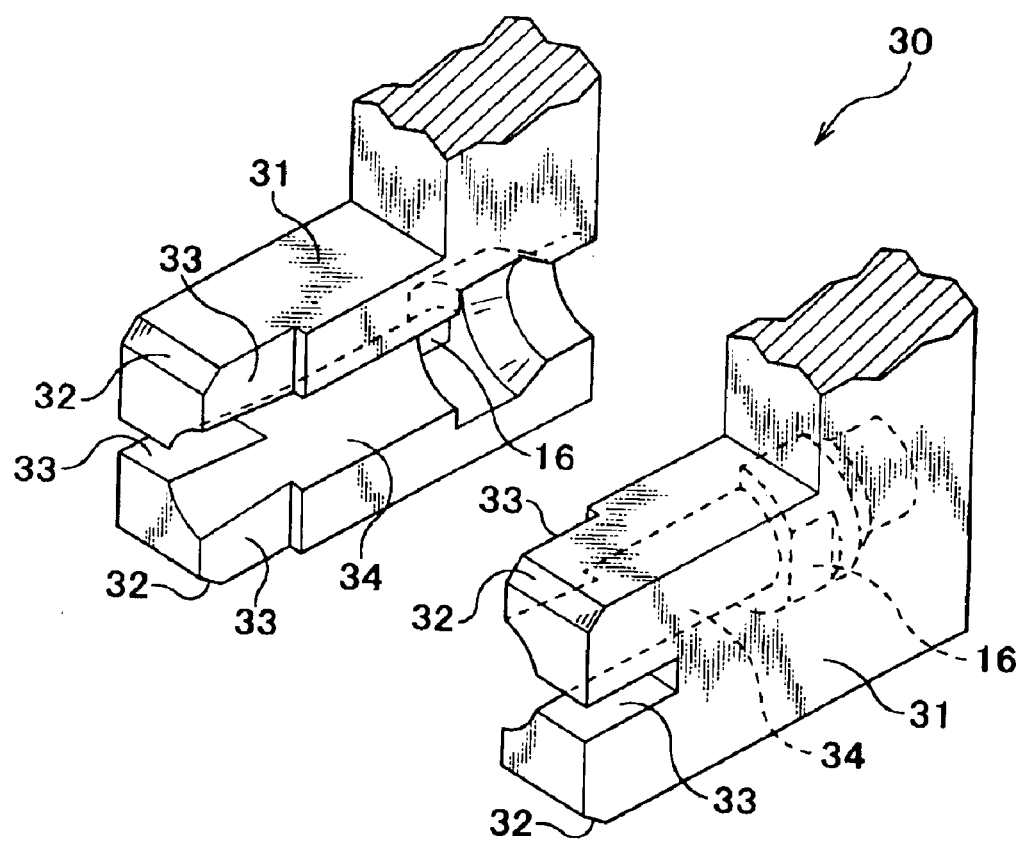
FIG. 9 is a perspective outline view of a handling device in an open state for holding the optical connector plug of FIG. 1.
Figure 10:
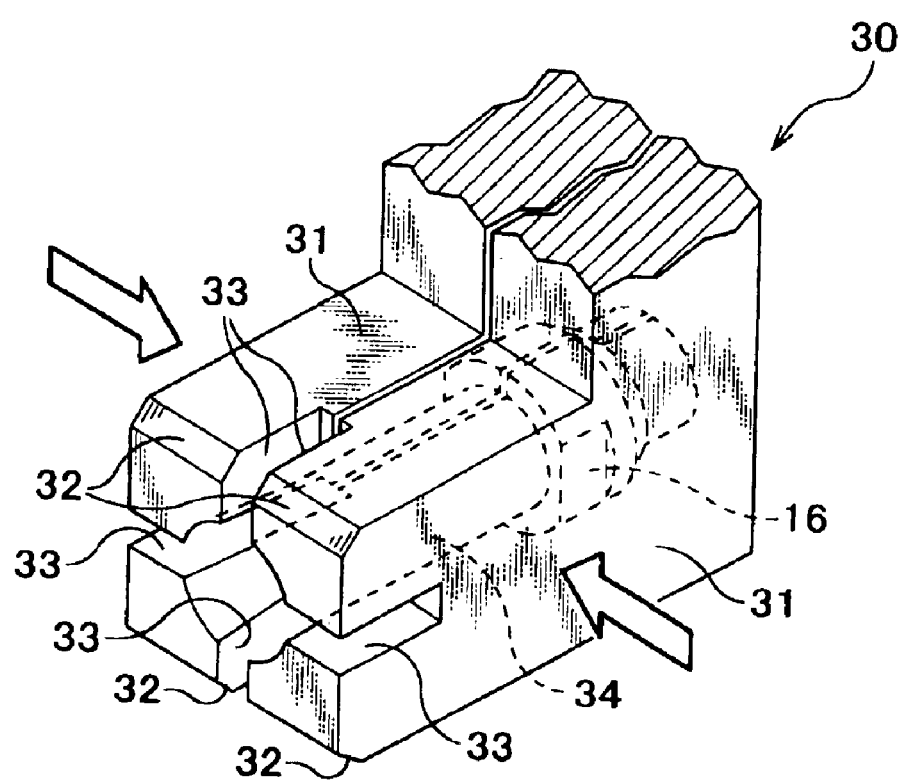
FIG. 10 is a perspective outline view of a handling device in a closed state for holding the optical connector plug of FIG. 1.
Figure 11:
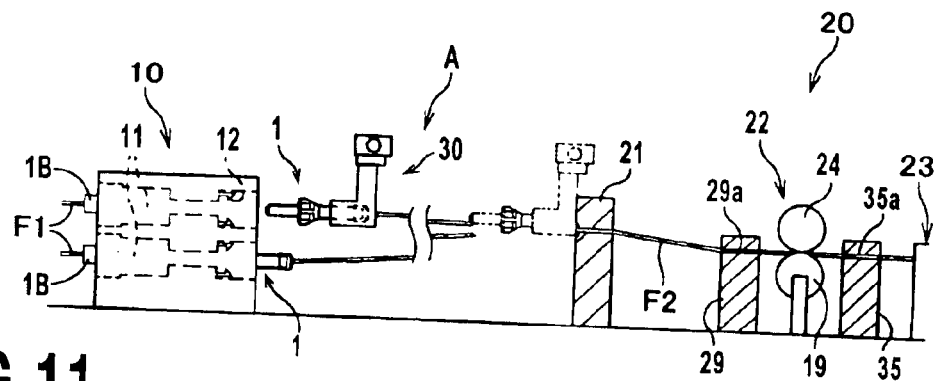
FIG. 11 is a side view schematically showing an outline of one embodiment of an optical fiber cross-connection apparatus according to the present invention, with an operated-side optical connector plug disconnected from the connection block.
Figure 12:
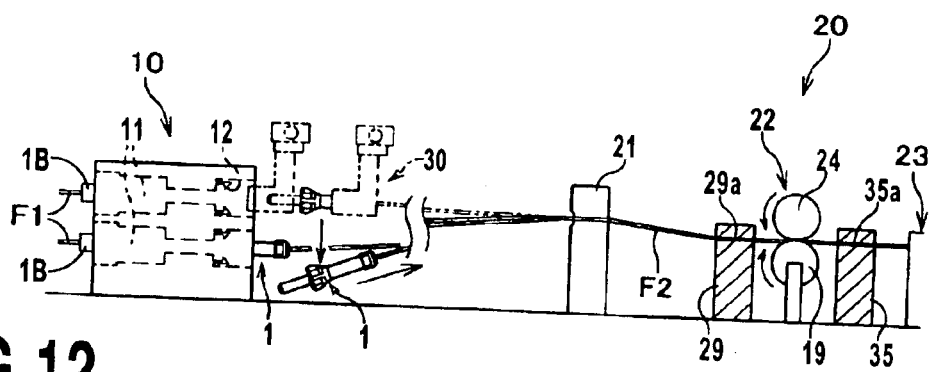
FIG. 12 is a side view schematically showing an outline of the optical fiber cross-connection apparatus of FIG. 11, with an operated-side optical connector plug released from the handling device.
Figure 13:
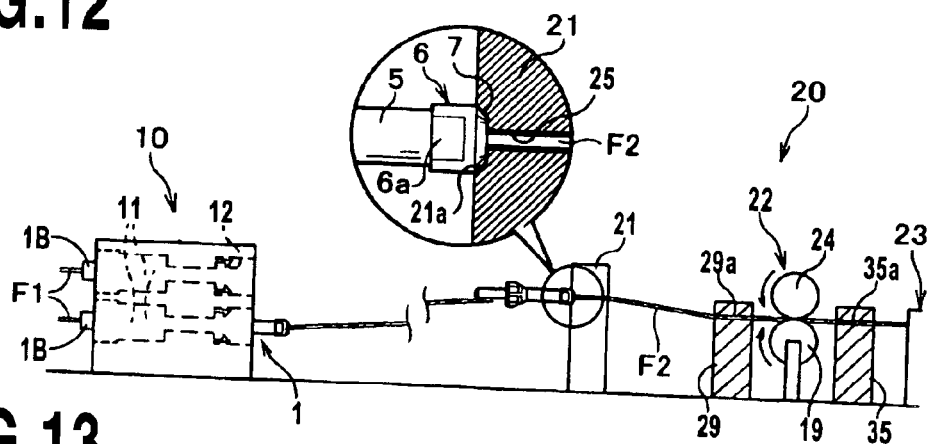
FIG. 13 is a side view schematically showing an outline of the optical fiber cross-connection apparatus of FIG. 11, with the operated-side optical connector plug received in a predetermined alignment in the optical connector plug alignment block.

Now, embodiments of the present invention will be described by referring to the accompanying drawings. FIGS. 1 to 3 are a side view of an optical connector plug of this invention as one embodiment and cross-sectional views taken along the lines II—II and III—III. FIG. 4 and FIG. 5 are overall perspective views of the optical connector plug as seen from the front and the rear. FIG. 6 to FIG. 8 are a side view showing the optical connector plug locked by a plug locking hook, a cross-sectional view taken along the line VII—VII and a cross-sectional view similar to FIG. 7 of a plug locking hook in another embodiment. FIG. 9 and FIG. 10 are perspective views of a handling device for holding an optical connector plug in an open state and in a closed state. FIG. 11 to FIG. 13 are overall side views of an optical fiber cross-connection apparatus, with FIG. 11 representing a state in which an operated-side optical connector plug is disconnected from the connection block, FIG. 12 representing a state in which the operated-side optical connector plug is released from the handling device and FIG. 13 representing a state in which the operated-side optical connector plug is received in a predetermined alignment in the optical connector plug alignment block.

Let us first explain about the construction of an optical connector plug and then, in an optical fiber cross-connection apparatus, describe how the optical connector plug, the optical fiber cross-connection apparatus and the optical connector plug alignment block are operated.

As shown in FIG. 1 to FIG. 5, the optical connector plug 1 has an inserted portion 2 disposed on the front end side for optical connection, a plug body 5 accommodating and holding the inserted portion 2, a flange portion 3 provided on the plug body 5 at the front end thereof from which the inserted portion 2 protrudes, a positioning/gripping portion 6 provided on the plug body 5 at the rear end thereof, and projections 4 extending from an outer diameter of the flange portion 3 toward an outer diameter of the plug body 5. The optical connector plug 1 has an optical fiber cord F2 passing therethrough which is optically connected by engaging a front end of the inserted portion 2 with an opposing inserted portion (not shown).

The inserted portion 2 used here has a construction of an angled physical contact (APC) optical connector plug in which its front end is polished at a certain angle together with an optical fiber connecting end surface not shown. The inserted portion 2 is not limited to any particular construction or material as long as it can assure an optical connection.

The plug body 5 of the optical connector plug 1 has a front end portion 9 formed cylindrical and having an opening at the front end side in which to insert the inserted portion 2, and a cylinder portion 8 formed cylindrical behind the front end portion 9 with its diameter smaller than that of the front end portion 9. The plug body 5 may also be formed uniform in diameter as long as it can receive and hold the inserted portion 2 and the optical fiber cord F2 for secure optical connection.

As shown in FIG. 1 to FIG. 7, the flange portion 3 of the optical connector plug 1 is formed like a ring of a predetermined width protruding outwardly from the front end portion 9 so that its diameter is larger than that of the front end portion 9 of the plug body 5. The flange portion 3 has a rounded portion 3a formed along its circumference to remove an angled edge and a hook engagement face 3b formed on a rear surface thereof facing the front end portion 9. This flange portion 3 is engaged by plug locking members 12 of an optical adapter 11 (see FIG. 11 to FIG. 13). While the flange portion 3 in this embodiment is formed circular when viewed from the front, it may take any desired shape, e.g., square, rectangle or even polygon.

As shown in FIG. 1 to FIG. 5, the projections 4 of the optical connector plug 1 have tapered surfaces 4a of a predetermined width extending from an outer diameter portion of the flange portion 3 toward the cylinder portion 8 of the plug body 5. In this embodiment, there are four projections 4 formed equidistantly (90 degrees apart) on a circumference of the plug body 5. End portions of the projections 4 on the side of the flange portion 3 engage the rear surface of the flange portion 3 and opposite end portions on the side of the cylinder portion 8 merge into an inclined surface, an annular tapered portion 4b, continuous with the tapered surfaces 4a.

The projections 4 may be formed of the same material as, and formed integral with, the plug body 5, or they may be formed of different materials than that of the plug body 5 and bonded or joined to the plug body 5. Further, while the length of the projections 4 in the direction of axis of the plug body 5 is set to range from the hook engagement face 3b of the flange portion 3 to the front end of the cylinder portion 8, it may be extended to a central part of the cylinder portion 8 if the projections 4 do not interfere with the gripping action of a handling device 30 described later.

Further, as shown in FIG. 1 to FIG. 3 and FIG. 6 and FIG. 7, the projections 4 each have a flat surface 4c, flush with the outer diameter of the flange portion 3, through which a tapered surface 4a is formed, so as to increase an area of contact between side surfaces of each projection 4 and locking hooks 13 of the plug locking members 12. The flat portion 4c of each projection 4 may not be provided if a sufficient contact area between the engaging locking hooks 13 and the projections 4 can be secured to prevent a possible rotation of the optical connector plug 1 in a circumferential direction of the inserted portion 2.

Further, as shown in FIG. 4 to FIG. 7, the interval in the plug circumferential direction at which the projections 4 are provided need only be such that the engagement of the projections 4 by the plug locking members 12 of the optical adapter 11 (see FIG. 11 to FIG. 13) can prevent the rotation of the optical connector plug 1 in the circumferential direction of the inserted portion 2. The projections 4, as shown in FIG. 7, are formed to extend crosswise so that vertically arranged projections 4 insert into recessed portions 13a formed between paired upper locking hooks 13 and between paired lower locking hooks 13 of the plug locking members 12. The projections 4 are not limited to any particular number, width and shape as long as they can prevent a possible rotation of the plug. Thus, if locking hooks 13A of the plug locking members 12 are not provided with the recessed portions 13a, the rotation of the plug in the circumferential direction can be prevented and the attitude of the plug for optical connection maintained by providing grooves fitted to the locking hooks 13A or projections 14 adjacent to the locking hooks 13A, as shown in FIG. 8.

As shown in FIG. 1 to FIG. 5, the positioning/gripping portion 6 at the rear end of the plug body 5 of the optical connector plug 1 has a pair of parallel rotational phase reference surfaces 6a extending vertically to form raised or recessed portions (in this case, recessed portions) in a circumferential outer diameter portion which is larger in diameter than the cylinder portion 8. The positioning/gripping portion 6 is held to a corresponding engagement reference portion 16 of the handling device 30 that grips and moves the optical connector plug 1, so that the attitude of the plug for optical connection can be maintained.

The rotational phase reference surfaces 6a are not limited to a particular shape or position (side surface or upper or lower surface) as long as they can form raised or recessed portions in the circumferential outer diameter portion and maintain a predetermined optical connection attitude. For example, they may be formed as shown in FIG. 27 to FIG. 32.

Figure 27:
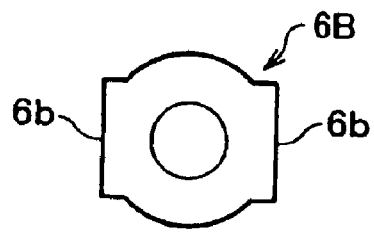
Figure 28:
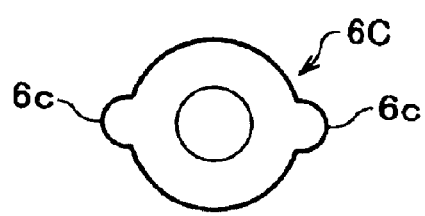
Figure 29:
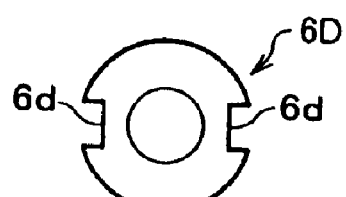

The positioning/gripping portion 6 may be formed as shown in FIG. 27, in which a positioning/gripping portion 6B has a pair of rectangular raised portions 6b protruding from a cylindrical portion at the rear end side of the cylinder portion 8. In another example, as shown in FIG. 28, a positioning/gripping portion 6C may have a pair of hemispherically raised portions 6c protruding from the cylindrical portion at the rear end side of the cylinder portion 8. Further, as shown in FIG. 29, a positioning/gripping portion 6D may have a pair of grooves 6d recessed from the cylindrical portion at the rear end side of the cylinder portion 8.

Figure 30:
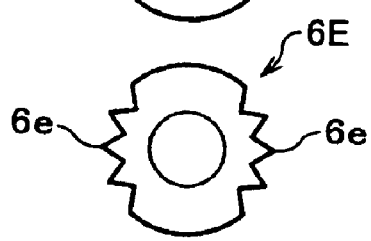
Figure 31:
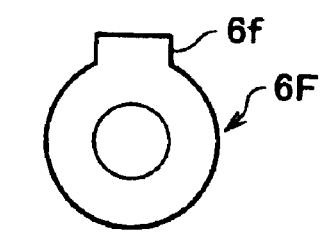
Figure 32:
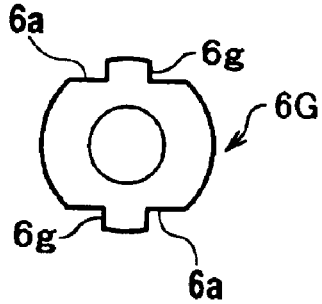
Figure 33:
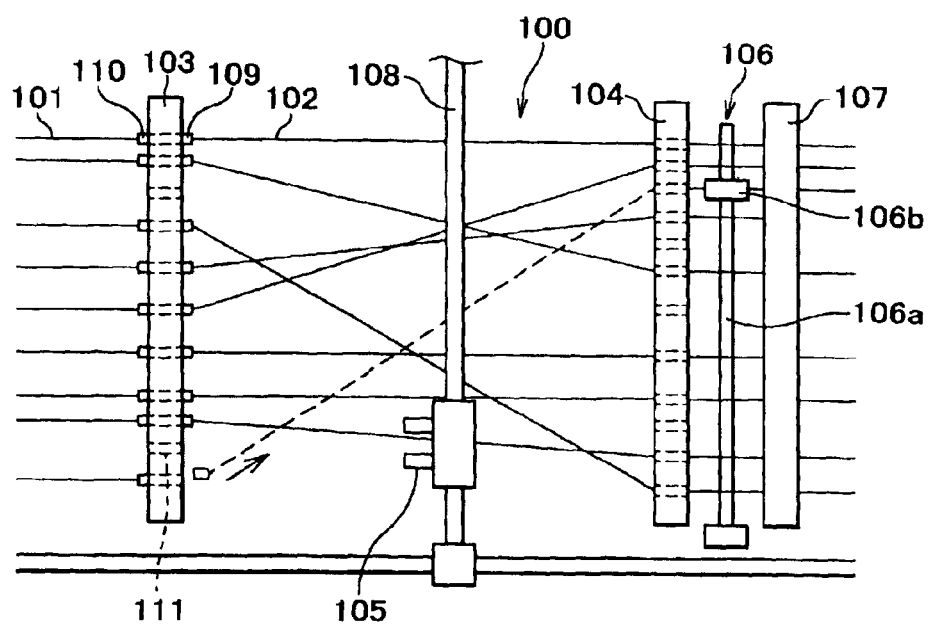
FIG. 33 is an overall plan view schematically showing an optical fiber cross-connection apparatus to which the present invention is applied.
Figure 34:
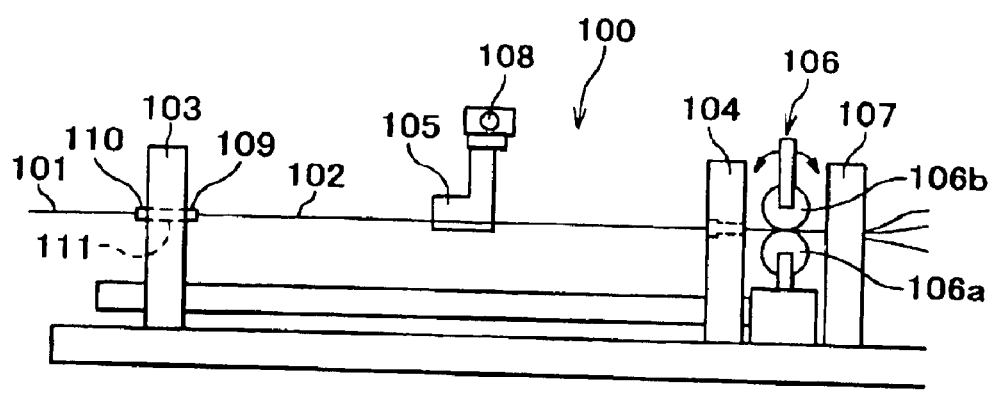
FIG. 34 is a side view of the optical fiber cross-connection apparatus of FIG. 33.

Further, as shown in FIG. 30, a positioning/gripping portion 6E may have a pair of serrated portions 6e extending longitudinally along the length of the cylindrical portion at the rear end side of the cylinder portion 8. In a further example, as shown in FIG. 31, a positioning/gripping portion 6F may have one rectangular raised portion 6f protruding from the cylindrical portion at the rear end side of the cylinder portion 8. In a still further example, as shown in FIG. 32, a positioning/gripping portion 6G may have a pair of rotational phase reference surfaces 6a of FIG. 26 and a pair of projections 6g protruding from the reference surfaces 6a.

For the constructions shown in FIG. 26 to FIG. 32, it is of course necessary to match the engagement reference portion 16 (see FIG. 9, FIG. 10) of the handling device 30 (FIG. 9, FIG. 10) to the shapes of the positioning/gripping portions 6–6G.

The positioning/gripping portion 6 of the optical connector plug 1 has at its rear portion an engaging supported portion 7 that is received and supported in a support hole 25 of an optical connector plug alignment block 21 when the plug is received in a predetermined alignment in the block 21. The engaging supported portion 7 has an inclined surface in a circumferential direction and when the optical connector plug 1 is received in the predetermined alignment in the optical connector plug alignment block 21, it is supported in the block so that the handling device 30 can grip the pair of rotational phase reference surfaces 6a and the cylinder portion 8.

The optical fiber cord F2 joined to the optical connector plug 1 may have an elliptical cross section, as in the case of a 2-core fiber tape shown in FIG. 4 and FIG. 5, in addition to a round cross section. Here, for the optical connector plug 1 to be supported always in a predetermined attitude in the optical connector plug alignment block 21, the optical fiber cord F2 is formed into an almost elliptical shape in cross section that has a longer radius and a shorter radius.

That is, as shown in FIG. 21 to FIG. 25, the optical fiber cords F2 to F2d are formed into an almost oval shape in cross section that is perpendicular to the longitudinal direction and which has a longer radius and a shorter radius passing through its cross-sectional gravity center. In addition to the near elliptical shape, the optical fiber cord may be formed into a rectangular shape, a gourd-like shape and also one in which a pair of serrations are formed on the outer circumference along the length of the optical fiber cord F2. The cord may take any other desired shape in cross section as long as the cord cross section can restrain the optical connector plug 1 so that, when the plug is received and supported in the optical connector plug alignment block 21 described later, the plug always assumes a particular attitude.

Next, by referring mainly to FIG. 11 to FIG. 13, we will describe an optical fiber cross-connection apparatus A and an optical connector plug alignment block 21 which both use the optical connector plugs 1 explained above as the operated-side optical connector plugs.

The optical fiber cross-connection apparatus A includes a connection block 10, a handling device 30, and an accommodation/alignment system 20. The connection block 10 has a plurality of jacks or optical adapters 11 aligned in a predetermined alignment, each of which receives at one end (first end) a stationary-side optical connector plug 1B and at the other end (second end) removably receives an operated-side optical connector plug 1 to optically connect them together. The handling device 30 has a lateral moving system (not shown) to insert the operated-side optical connector plug 1 into the second end of a given optical adapter 11 of the connection block 10. The accommodation/alignment system 20 is provided to oppose the connection block 10 and adapted to cross-connect of the operated-side optical connector plugs 1. The accommodation/alignment system 20 has an optical connector plug alignment block 21 to set the operated-side optical connector plugs 1 in a predetermined attitude or alignment; an optical fiber cord retraction device 22 provided behind the optical connector plug alignment block 21; and a redundant cord storage unit 23 provided behind the optical fiber cord retraction device 22.

The connection block 10 has an array of optical adapters 11 arranged in rows and columns. A positioning sensor (not shown) may be provided at a position facing the handling device 30 to precisely determine the position of the handling device 30, as necessary.

The optical adapters 11 establish optical connections between the stationary-side optical connector plugs 1B inserted into one longitudinal end thereof and the operated-side optical connector plugs 1 inserted into the other end. In this embodiment, the construction of an optical fiber cross-connection apparatus not shown for the stationary-side optical connector plugs 1B is different from that of an optical fiber cross-connection apparatus A for the operated-side optical connector plugs 1. The operated-side optical connector plugs 1 inserted in the optical adapters 11 are of general use type, identical in construction, for example, with SC or MU type plugs. That is, they have a coil spring (not shown) therein which, when the operated-side optical connector plug 1 is inserted into the optical adapter 11, keeps the inserted portion 2 of the plug 1 pressed toward the stationary-side optical connector plug 1B.

As shown in FIGS. 11–13 and FIGS. 6–7, the optical adapter 11 is formed with a split sleeve (not shown) into which the inserted portions 2 of the optical connector plugs 1, 1B are inserted, and also has a cylindrical ferrule (not shown) for optically connecting these plugs. The optical adapter 11 also has a pair of upper and lower plug locking members 12 extending horizontally from the second end thereof, into which the operated-side optical connector plug 1 is inserted.

As shown in FIG. 6 and FIG. 7, the plug locking members 12 are arranged at positions vertically separated from each other by a distance slightly larger than an outer diameter of the flange portion 3. Each of the upper and lower plug locking members 12 has a pair of locking hooks 13 with a recessed portion 13a formed therebetween. The recessed portions 13a between the paired locking hooks 13 of the upper and lower hooks have a width such that the paired locking hooks 13 can engage over each of the projections 4.

The plug locking members 12 are made of a material that produces an elastic force, against which they are vertically opened by the pressing action of the handling device 30 described later and which, when they are released from the pressing action of the handling device 30, causes them to return to their preset positions. While in this embodiment the plug locking members 12 are arranged to hold the operated-side optical connector plug 1 from above and below, they may be arranged to clamp the plug from lateral sides. It is also possible to arrange the plug locking members 12 at positions corresponding to the projections 4 formed in the operated-side optical connector plug 1 so that the hooks adjoin the projections 4. The handling device 30, as shown in FIG. 6 to FIG. 13, has a pair of fingers 31 for holding the operated-side optical connector plug 1 and is moved by a lateral moving system (not shown) that can move freely between the connection block 10 and the optical connector plug alignment block 21 in X, Y and Z directions (in a vertical direction, a first horizontal direction and a second horizontal direction perpendicular to the first two directions). This handling device 30 is formed to match the shape of the operated-side optical connector plug 1 and the paired left and right fingers 31 are formed laterally symmetrical.

Each of the paired fingers 31 is shaped like a letter L and has a pair of upper and lower engaging/pushing portions 32, notched portions 33 formed at positions corresponding to the projections 4, a body support portion 34 for engaging and holding the plug body 5 of the operated-side optical connector plug 1, and one of paired engagement reference portions 16 that engage the positioning/gripping portion 6 of the operated-side optical connector plug 1 to keep the operated-side plug in a predetermined attitude or alignment at all times.

The handling device 30 is not limited to any particular configuration or shape as long as it can move the operated-side optical connector plug 1 to engage it with or disengage it from the plug locking members 12 and also has the above-described engagement reference portions 16.

Next, the construction of the accommodation/alignment system 20 will be explained. As shown in FIG. 11 to FIG. 13, the optical connector plug alignment block 21 supports the operated-side optical connector plugs 1 in a row at a predetermined height, with the plugs protruding horizontally in a predetermined alignment. The optical connector plug alignment block 21 has alignment through-holes 25 passing therethrough as guide passages for the optical fiber cords F2 of the operated-side optical connector plugs 1. The alignment through-holes 25 are made to match the shape of the optical fiber cords F2 and receive them therethrough. The alignment through-holes 25 have a guide portion 21a at one end.

The alignment through-holes 25 in the optical connector plug alignment block 21 are formed as through-holes whose cross sections match oval or flat cross sections of the optical fiber cords F2 of the operated-side optical connector plugs 1. In this embodiment, the alignment through-holes 25 are so set that their longer radius direction is vertical and shorter radius direction horizontal. This causes the optical fiber cords F2 of the operated-side plugs to pass through the alignment through-holes 25 in such an attitude that their longer radius direction is vertical and shorter radius direction horizontal. The guide portions 21a of the optical connector plug alignment block 21 have a conical inclined surface (see FIG. 16) which the engaging supported portion 7 of the operated-side optical connector plug 1 engages.

Figure 16:
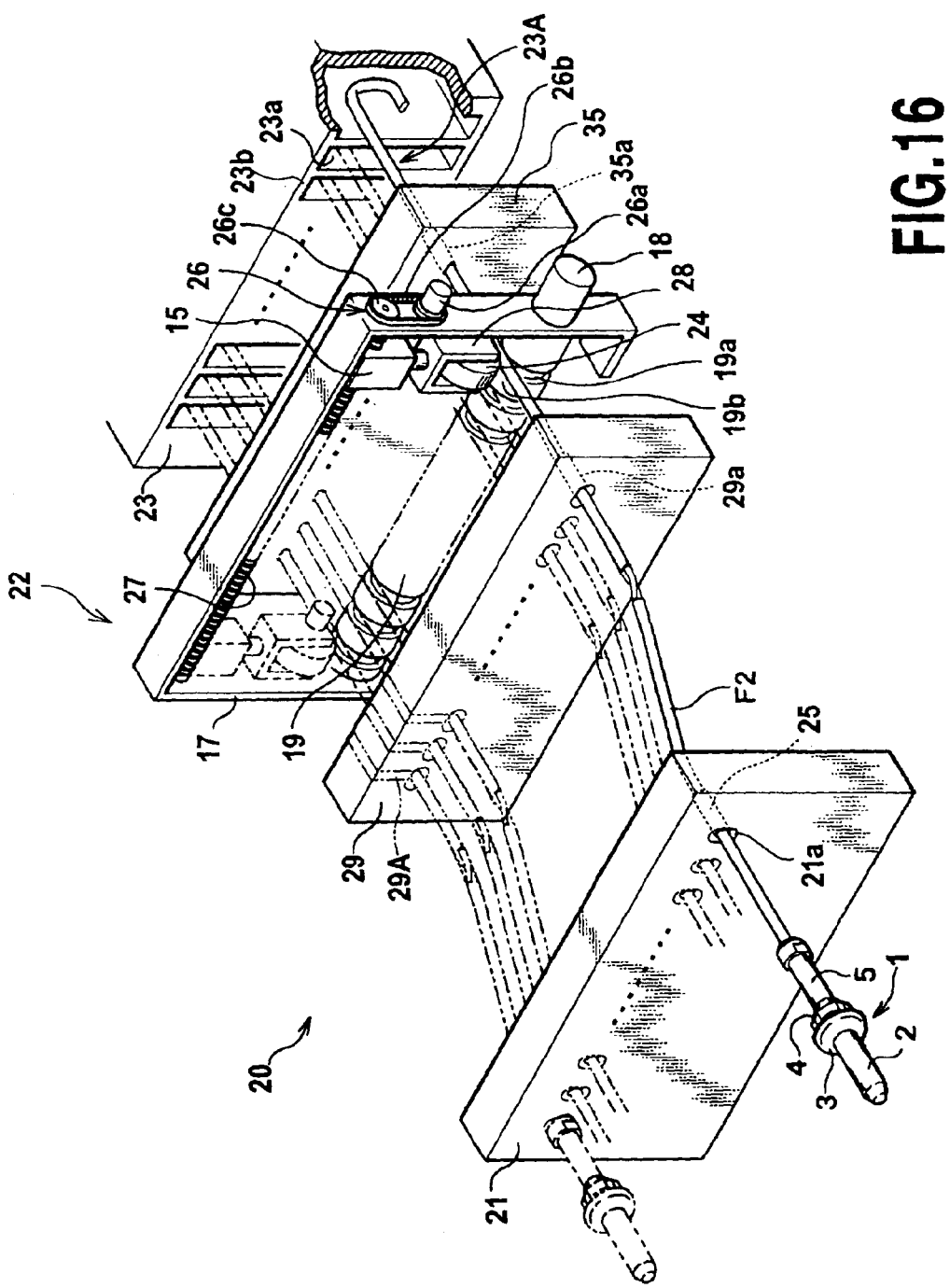
FIG. 16 is a perspective view schematically showing an outline of one embodiment of an optical connector plug alignment block according to the present invention.

The optical fiber cord retraction device 22, as shown in FIG. 16, has a retraction roller 19 and an idle roller 24, both provided behind the optical connector plug alignment block 21 and in front of the redundant cord storage unit 23 at predetermined distances from the alignment block 21 and the storage unit 23. The idle roller 24 is disposed above the retraction roller 19 in such a manner that it can be moved by a lateral moving system 26 in an axial direction of the retraction roller 19. The optical fiber cord retraction device 22 has a first guide block 29 provided on the optical connector plug alignment block 21 side (front side) facing the retraction roller 19 and a second guide block 35 provided on the redundant cord storage unit 23 side (rear side) facing the retraction roller 19.

Figure 17:
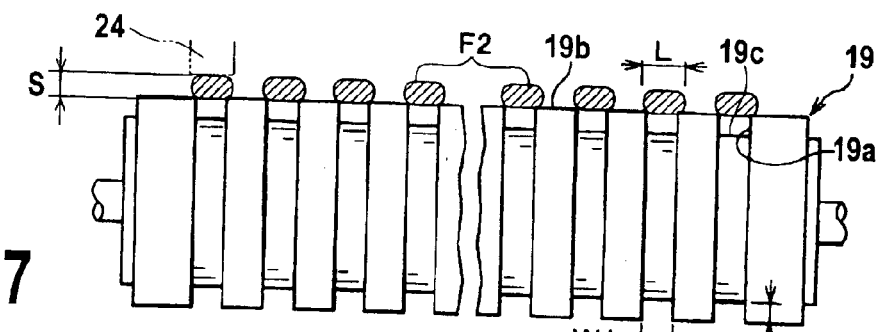
FIGS. 17–20 are front views showing relations between optical fiber cords and retraction rollers formed with guide grooves of different cross-sectional shapes in the optical fiber cord retraction device.

As shown in FIG. 16 and FIG. 17, the retraction roller 19 is rotatably supported on a support frame 17 through a rotational driving system 18 and has guide grooves 19a formed on its outer circumferential surface at predetermined intervals. The height at which the retraction roller 19 is provided on the support frame 17 is such that the optical fiber cords F2 of the operated-side optical connector plugs 1 to be received in a predetermined alignment in the optical connector plug alignment block 21 can be appropriately guided on the retraction roller 19. In this example, since the optical fiber cords F2 of the operated-side plugs are guided through the first guide block 29, there is a large degree of freedom in setting the distance between the optical connector plug alignment block 21 and the retraction roller 19. Similarly, the distance between the redundant cord storage unit 23 and the retraction roller 19 also has a high degree of freedom since the optical fiber cords F2 are guided through the second guide block 35.

The retraction roller 19 has the same number of guide grooves 19a, separated at equal intervals by land portions 19b or spacers, as the optical fiber cords F2 of the operated-side plugs 1 that are to be retracted properly into the optical connector plug alignment block 21. The guide grooves 19a may not be formed over the entire axial length of the retraction roller 19, but only at positions where the optical fiber cords F2 are considered, from past data on actual use, likely to develop lasting deformations such as twisting and bending. They may also be formed at any desired position among three equally divided portions of the axial length of the retraction roller 19, e.g., at a central portion or at side portions.

The guide grooves 19a are not limited to a particular configuration and may adopt any desired configurations, such as shown in FIG. 17 to FIG. 20, as long as they can appropriately feed the optical fiber cords F2, held between the idle roller 24 and the retraction roller 19.

That is, as shown in FIG. 17, the guide grooves 19a are formed such that their width W1 is smaller than a longer diameter L of the optical fiber cords F2 and that their depth d1 is deep enough to keep the optical fiber cords F2 out of contact with their bottom 19c. While the depth d1 of the guide grooves 19a is set smaller than a shorter diameter S of the optical fiber cords F2, it may be set so that the optical fiber cords F2 contact the bottom 19c.

Figure 18:
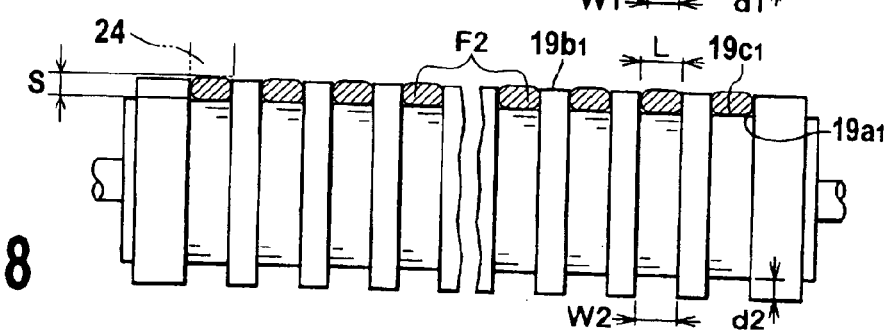

Further, in a configuration shown in FIG. 18, guide grooves $19a_1$ have a width W2 equal to or larger than the longer diameter L of the optical fiber cords F2 and a depth d2 such that the optical fiber cords F2 are in contact with a bottom $19c_1$ of the guide grooves $19a_1$. The depth d2 of the guide grooves $19a_1$ is set smaller than the shorter diameter S of the optical fiber cords F2. Thus, the guide grooves $19a_1$ have a greater contact area with each of the optical fiber cords F2 and therefore can guide the optical fiber cords F2 stably.

Figure 19:
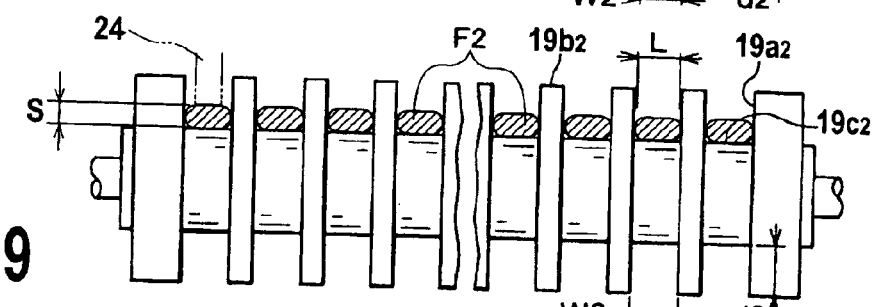

In another configuration shown in FIG. 19, guide grooves $19a_2$ have a width W3 equal to or larger than the longer diameter L of the optical fiber cords F2 and a depth d3 such that the optical fiber cords F2 are in contact with a bottom $19c_2$ of the guide grooves $19a_2$. The depth d3 of the guide grooves $19a_2$ is set larger than the shorter diameter S of the optical fiber cords F2. Therefore, the idle roller 24 is formed to a width that allows its engagement with the optical fiber cord F2 or is provided with a thin portion 24b (see FIG. 20) that can insert into the guide groove $19a_3$. As a result, the optical fiber cord F2 is accommodated in the guide groove $19a_2$ as it is retracted or drawn, so that even if the optical fiber cord F2 develops lasting deformations such as twisting and bending, the cord can be retracted or drawn appropriately.

Figure 20:
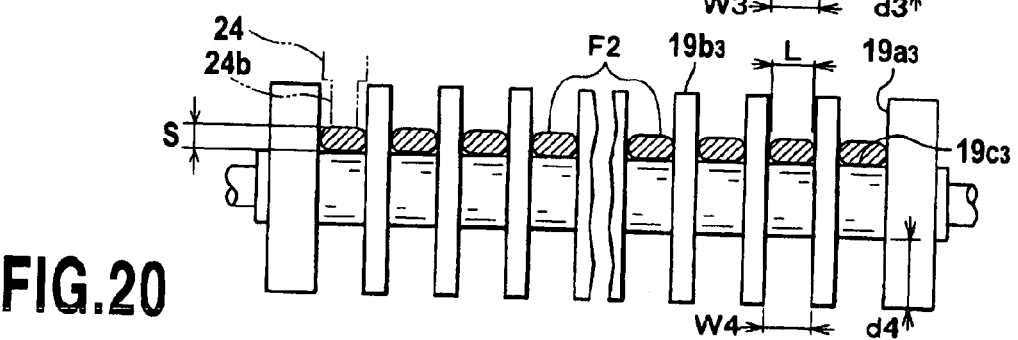
Figure 21:
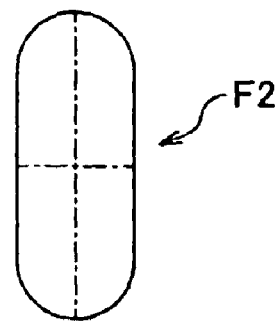
FIGS. 21–25 are schematic diagrams showing differing cross-sectional shapes of optical fiber cords according to the present invention.
Figure 22:
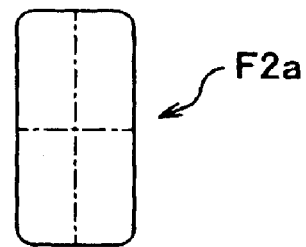
Figure 23:
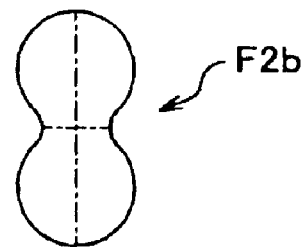
Figure 24:
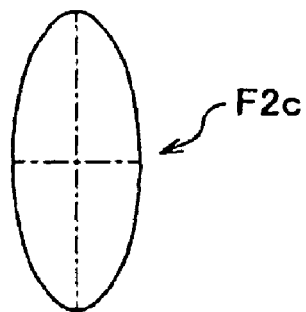
Figure 25:
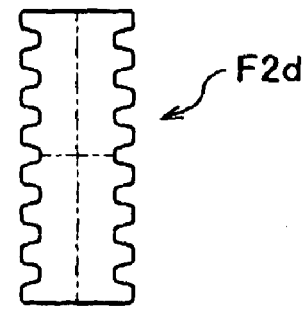

In still another configuration shown in FIG. 20, guide grooves $19a_3$ have a width W4 equal to or larger than the longer diameter L of the optical fiber cords F2 and a depth d4 such that the optical fiber cords F2 are in contact with a bottom 19$c_3$ of the guide grooves 19$a_3$. The depth d4 of the guide grooves 19$a_3$ is set 1.5 times or more larger than the shorter diameter S of the optical fiber cords F2. Therefore, the idle roller 24 is formed to a width (see FIG. 19) that allows its engagement with the optical fiber cord F2 or is provided at its circumference with a thin portion 24b (see FIG. 20) that can engage the optical fiber cord F2. As a result, even if the optical fiber cord F2 develops lasting deformations such as twisting and bending, these erratic deformations can be absorbed within the guide groove 19$a_3$ as the cord is guided through the groove, thus assuring an appropriate transport of the cord.

Although the cross sections of the guide grooves 19$a$–19$a_3$ in FIG. 17 to FIG. 20 have been described to be rectangular as an example, they may be formed into a triangle, trapezoid, semicircle, or semi-ellipse which matches the cross-sectional shape of the optical fiber cord F2. The guide grooves 19$a$–19$a_3$ or the land portions 19$b$–19$b_3$ may be formed directly on the retraction roller 19. Alternatively, a cylindrical member formed with the guide grooves 19$a$–19$a_3$ or the land portions 19$b$–19$b_3$ may be press-fitted onto a column-shaped core member to form the retraction roller 19. It is also possible to form a large-friction surface with, for example, fine undulations (not shown) or use a material of large frictional resistance such as rubber (not shown) in that part of the retraction roller 19 which engages the optical fiber cord F2.

Further, as shown in FIG. 16, the rotational driving system 18 rotates the retraction roller 19 at a predetermined speed and switches the rotation between a clockwise and a counterclockwise direction, as necessary, through a drive motor (with or without a reduction gears) secured to the support frame 17.

Next, we will describe the idle roller 24 of the optical fiber cord retraction device 22. As shown in FIG. 16 and FIG. 17, the idle roller 24 is rotatably supported on a holder 28, which in turn is supported on a slider 15 so as to be vertically movable toward or away from the retraction roller 19. The slider 15 is mounted on a feed screw 27 as a motion guide extending in the direction of axis of the retraction roller 19. This idle roller 24 is formed to a width such that it can engage a given optical fiber cord F2. As with the retraction roller 19, the idle roller 24 may also be constructed (not shown) to produce an increased friction for the optical fiber cord F2.

The idle roller 24 is driven to rotate in contact with the optical fiber cord F2 by the rotation of the retraction roller 19. It is also possible to provide a drive system for the idle roller 24 independent of the drive system for the retraction roller 19 and rotate the idle roller 24 in synchronism with the retraction roller 19.

The lateral moving system 26 for moving the idle roller 24 in the axial direction of the retraction roller 19 has, in one example shown in FIG. 16, a drive motor 26a for rotating the feed screw 27, a drive belt 26b and a transmission pulley 26c. Rotating the feed screw 27 can move the slider 15, and therefore the idle roller 24, along the feed screw 27 to a position on a given optical fiber cord F2.

The slider 15 has a lift mechanism (not shown) to raise or lower the holder 28, and when the slider 15 is moved in the axial direction of the retraction roller 19, the idle roller 24 is lifted out of contact with the optical fiber cord F2. After the idle roller 24 reaches a position directly above the given optical fiber cord F2, the slider 15 is stopped and the holder 28 lowered to the retraction roller 19, to engage the idle roller 24 against the optical fiber cord F2.

As shown in FIG. 16, the first guide block 29 is a wall plate of a certain thickness which has, as guide passages of this invention, the same number of guide through-holes 29a as that of the optical fiber cords F2 of the operated-side plugs 1 that are to be received in a predetermined alignment in the optical connector plug alignment block 21. The guide through-holes 29a in the first guide block 29 are set at a height that allows the optical fiber cords F2 to be guided appropriately into the guide grooves 19a of the retraction roller 19. In this construction, the first guide block 29 may be divided along the center line of the guide through-holes 29a into an upper and a lower portion (not shown). It is also possible to use guide grooves 29A, indicated by imaginary lines in FIG. 16, instead of the guide through-holes 29a in the first guide block 29. In this embodiment, the guide through-holes 29a are aligned horizontal by setting their longer radius direction horizontal and shorter radius direction vertical so that the optical fiber cords F2 pass through the guide through-holes 29a in an alignment such that a longer radius direction of the optical fiber cords F2 is horizontal and a shorter radius direction vertical. That is, the optical fiber cords F2 are twisted through 90 degrees between the optical connector plug alignment block 21 and the first guide block 29. Thus, after having passed through the second guide block 35, the optical fiber cords F2 have their shorter radius directed vertically and thus can easily be folded in vertical tiers as they are accommodated in the redundant cord storage unit 23. This prevents a possible twisting of the cords, assuring their efficient storage.

In the case of the first guide block 29 with the guide grooves 29A, the guide grooves 29A may be formed in an L shape (not shown) to restrict a vertical movement of the optical fiber cords F2. The second guide block 35 has the same construction as the first guide block 29. That is, it has a line of guide through-holes 35a set in a predetermined alignment with their longer radius direction set horizontal and shorter radius direction set vertical. Thus, the optical fiber cords F2 situated between the first guide block 29 and the second guide block 35 are held in a straight line.

Depending on the cross-sectional shape of the optical fiber cords F2, it is possible to omit the first guide block 29 or the second guide block 35.

Next, the optical connector plug alignment block 21, as shown in FIG. 16, has the same number of guide portions 21a, which support the engaging supported portions 7 at the rear end of the operated-side optical connector plugs 1, as that of the operated-side plugs 1 and also the same number of alignment through-holes 25, that match the outer shape of the optical fiber cords F2, as that of the optical fiber cords F2. When the optical fiber cords F2 are retracted into the alignment through-holes 25 of the alignment block 21, the engaging supported portions 7 of the operated-side optical connector plugs 1 are inserted into the guide portions 21a, with the result that the operated-side optical connector plugs 1 protrude perpendicularly from the alignment block 21 (see FIG. 13). In this case, since the inner circumference of each alignment through-holes 25 is given a certain directivity or alignment, the operated-side optical connector plug 1 is set in a rotary direction so that its paired rotational phase reference surfaces 6a are parallel to the longer radius direction of the optical fiber cord F2 joined to the operated-side plug 1.

The redundant cord storage unit 23, as shown in FIG. 16, has a plurality of storing compartments 23A, each with a partition plate 23a disposed between the individual optical fiber cords F2 and a cover plate 23b disposed above the partition plate 23a, in order to accommodate in an orderly manner the optical fiber cords F2 drawn out from the optical fiber cord retraction device 22 without entangling them. In addition to an arrangement in which the partition plates 23a are set vertical in the redundant cord storage unit 23 as in this embodiment, they may be inclined at a predetermined angle. In either case, the partition plates 23a are formed to such width and height dimensions as will prevent adjacent optical fiber cords F2 from getting entangled.

Although, in the aforementioned optical fiber cord retraction device 22, the retraction roller 19 is formed with the guide grooves 19a to ensure an appropriate retraction of the optical fiber cords F2 even if they develop lasting deformations such as twisting and bending, it is possible to form a guide groove similar to the guide grooves 19a, $19a_1$ shown in FIG. 17 and FIG. 18 in the circumferential surface of the idle roller 24 and to have the entire surface of the retraction roller 19 formed planar.

Further, the lateral moving system 26 for moving the idle roller 24 in the axial direction of the retraction roller 19 is not limited to a particular configuration as long as it can move the idle roller 24 appropriately. For example, the feed screw 27 may be replaced with a belt drive.

Next, a cross-connecting operation performed by the optical fiber cross-connection apparatus A will be explained by referring mainly to FIG. 6 to FIG. 13. As shown in FIG. 11 and FIGS. 9–10, the handling device 30 grips one of the arrayed operated-side optical connector plugs 1 supported in a predetermined alignment ment or attitude in the optical connector plug alignment block 21. During this gripping process, the paired rotational phase reference surfaces 6a of the positioning/gripping portion 6 of the operated-side optical connector plug 1 engage the corresponding engagement reference portions 16 of both fingers 31 and the plug body 5 engages the body support portions 34.

Gripping the operated-side optical connector plug 1 supported in the alignment block 21 with the handling device 30 can set and maintain the operated-side plug 1 in an attitude or alignment suited for inserting into the optical adapter 11 for optical connection.

The operated-side optical connector plug 1 thus held in the connection alignment is transported by the handling device 30 to the front of a target optical adapter 11. Then, as the handling device 30 holding the operated-side optical connector plug 1 advances, the engaging/pushing portions 32 push open the locking hooks 13 of the pair of upper and lower plug locking members 12 against the hooks' elastic force to insert the inserted portion 2 of the operated-side optical connector plug 1 into the optical adapter 11. When the flange portion 3 moves past the locking hooks 13, the plug locking members 12 snap back to their original positions by their elastic force to lock the flange portion 3 with the locking hooks 13, integrally engaging the operated-side optical connector plug 1 to the second end of the optical adapter 11 to establish an optical connection with the stationary-side optical connector plug 1B. By moving the handling device 30 to stop its engaging/pushing portions 32 from pressing against the locking hooks 13 of the plug locking members 12, the plug locking members 12 can be reset to their original positions.

At this time, since the projections 4 of the operated-side optical connector plug 1 are held in the recessed portions 13a of the locking hooks 13, the operated-side optical connector plug 1 is blocked from rotation by the locking hooks 13, thus maintaining an appropriate optical connection at all times with an inserted portion (not shown) of the stationary-side optical connector plug 1B inserted into the first end of the optical adapter 11.

Next, when the operated-side optical connector plug 1 is to be disconnected from the optical adapter 11, the engaging/pushing portions 32 of the fingers 31 are pressed against the inclined portions of the locking hooks 13 to push them radially-outwardly, causing the plug locking members 12 to vertically open, as shown in FIG. 12 and FIG. 6. As a result, the flange portion 3 of the operated-side optical connector plug 1 is released from the locking hooks 13.

At the same time, a coil spring built into the operated-side optical connector plug 1 pushes the inserted portion 2 outwardly from the second end of the optical adapter 11 to part from the inserted portion of the stationary-side optical connector plug 1B and move out of the optical adapter 11. Then, the operated-side optical connector plug 1 pushed out of the optical adapter 11 can now be moved rearwardly away from the connection block 10 by the handling device 30, with its projections 4 still engaged in the notched portions 33 of the handling device 30 and with its attitude allowing for an optical connection maintained.

Next, the handling device 30 that has disengaged the operated-side optical connector plug 1 from the optical adapter 11 opens its fingers 31 to completely release the operated-side plug 1. At this time, since the operated-side plug 1 assumes a drawn-out position from the optical connector plug alignment block 21 and is aligned such that its longer radius is vertical, a vertical deflection of the operated-side plug 1 by its own weight can be minimized. In this state, the optical fiber cord retraction device 22 is activated to pull the operated-side optical connector plug 1 toward the optical connector plug alignment block 21.

Figure 14:
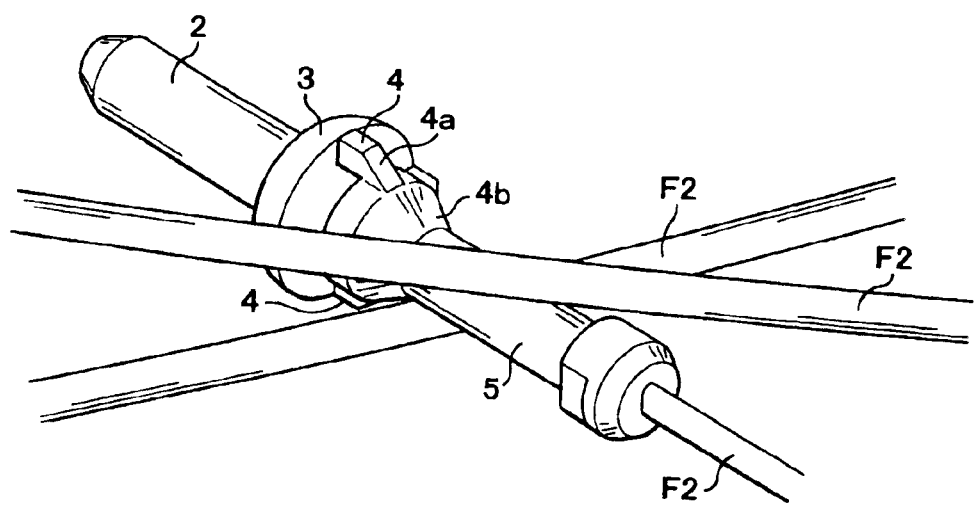
FIG. 14 is a perspective view showing a tapered portion of the optical connector plug of FIG. 1 about to pass between optical fiber cords.
Figure 15:
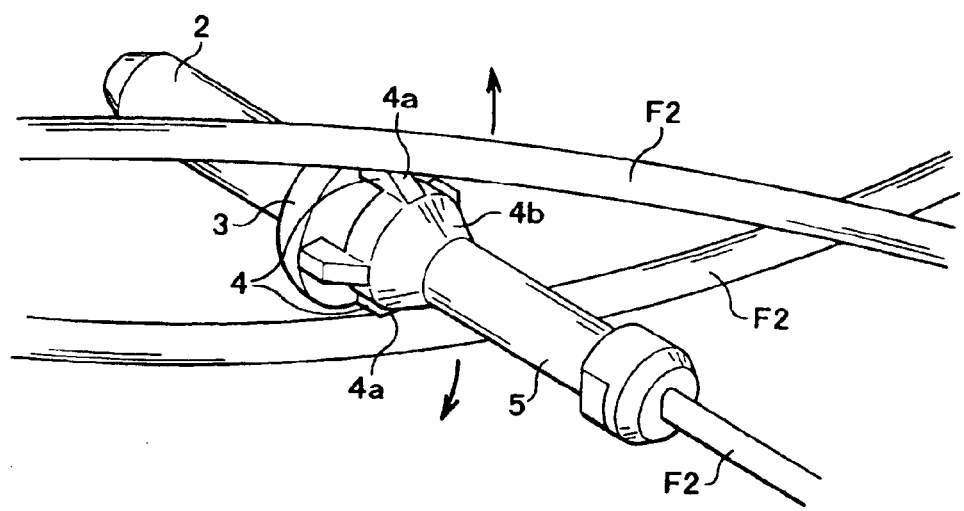
FIG. 15 is a perspective view showing the tapered portion of the optical connector plug of FIG. 1 just passing between optical fiber cords.

At this time, as shown in FIG. 14 and FIG. 15, other optical fiber cords F2 hinder a smooth movement of the cord of interest. However, the tapered surfaces 4a of the projections 4 alleviate a catching action of a step formed between the plug body 5 and the flange portion 3, allowing the optical fiber cord F2 of interest to slip through between other optical fiber cords F2 spread between the connection block 10 and the optical connector plug alignment block 21. Then, the optical fiber cord retraction device 22 retracts the optical fiber cord F2 of the operated-side plug 1 into the redundant cord storage unit 23. At the same time, as the optical fiber cord F2 is guided through the guide portion 21a of the optical connector plug alignment block 21, the engaging supported portion 7 of the operated-side optical connector plug 1 is brought into intimate engagement with the guide portion 21a of the optical connector plug alignment block 21. Therefore, when supported on the optical connector plug alignment block 21, the operated-side optical connector plug 1 always assumes and maintains an alignment that allows for optical connection.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical fiber cross-connection apparatus comprising:
   a connection block having a plurality of optical adapters arranged in a predetermined alignment, to first ends of which are inserted stationary-side optical connector plugs joined to front ends of stationary-side optical fiber cords and to second ends of which are removably inserted operated-side optical connector plugs for optical connection with the stationary-side optical connector plug;

a plurality of locking members provided to the connection block to lock the operated-side optical connector plugs to the optical adapters;

an optical connector plug alignment block having a plurality of guide passages formed therein in a predetermined alignment which allow a plurality of operated-side optical fiber cords to pass therethrough so that the operated-side optical connector plugs are lain between the optical connector plug alignment block and the connection block; and a handling device to act on the locking member to unlocking the operated-side optical connector plug from the optical adapter, and to grip the operated-side optical connector plug held in the optical connector plug alignment block and insert it into the given optical adapter;

wherein the optical connector plug has:

an inserted portion removably inserted into one end of the optical adapter;

a plug body joined to a front end of the optical fiber cord;

a locking portion formed between the plug body and the inserted portion and engaged by the locking member; and a rotational phase reference surface formed in the plug body away from the inserted portion and gripped by the handling device.

2. An optical fiber cross-connection apparatus as claimed in claim 1, wherein the optical fiber cord has a cross-sectional shape such that its dimension along a first direction perpendicular to a longitudinal direction of the cord and its dimension along a second direction perpendicular to the longitudinal direction and the first direction differ from each other;

wherein the plug body is joined to a front end of the optical fiber cord with the first and second directions associated with the rotational phase reference surface;

wherein the guide passages in the optical connector plug alignment block have a cross-sectional shape corresponding to that of the optical fiber cord.

3. An optical fiber cross-connection apparatus comprising:

a connection block having a plurality of optical adapters arranged in a predetermined alignment, to first ends of which are inserted stationary-side optical connector plugs joined to front ends of stationary-side optical fiber cords and to second ends of which are removably inserted operated-side optical connector plugs for optical connection with the stationary-side optical connector plug;

a plurality of locking members provided to the connection block to lock the operated-side optical connector plugs to the optical adapters;

a redundant cord storage unit into which an operated-side optical fiber cord joined at its front end with the operated-side optical connector plug is retracted after the operated-side optical connector plug is optically disconnected from the stationary-side optical connector plug;

an optical connector plug alignment block provided between the redundant cord storage unit and the connection block and having a plurality of guide passages formed therein in a predetermined alignment which allow the plurality of operated-side optical fiber cords to pass therethrough so that the operated-side optical connector plugs are lain between the optical connector plug alignment block and the connection block;

an optical fiber cord retraction means provided between the optical connector plug alignment block and the redundant cord storage unit to retract the operated-side optical fiber cord of the optically disconnected operated-side optical connector plug into the redundant cord storage unit; and a handling device to act on the locking member to unlock the operated-side optical connector plug from the optical adapter, and to grip the operated-side optical connector plug held in the optical connector plug alignment block by the optical fiber cord retraction means and insert it into the given optical adapter;

wherein the optical fiber cord retraction means has:

a retraction roller driven to rotate and having an outer circumferential surface formed with a plurality of guide grooves axially spaced at predetermined intervals, the guide grooves being adapted to hold individual operated-side optical fiber cords;

a slider movable parallel to a rotating axis of the retraction roller; and a rotatable idle roller supported on the slider so that it can be moved toward and away from the retraction roller and adapted to hold between it and the retraction roller the operated-side optical fiber cord being retracted into the redundant cord storage unit.

* * * * *

UNITED STATES PATENT AND TRADEMARK OFFICE
CERTIFICATE OF CORRECTION

PATENT NO. : 6,877,906 B2
DATED : April 12, 2005
INVENTOR(S) : Masato Mizukami et al.

It is certified that error appears in the above-identified patent and that said Letters Patent is hereby corrected as shown below:

Column 5,
Line 52, change "unlocking" to -- unlock --.

Column 11,
Line 23, after "alignment block" insert -- , --.
Line 24, after "present invention," remove "since".
Line 27, change "a horizontally condition" to -- in a horizontal condition --.

Column 13,
Line 17, change "not shown" to -- (not shown) --.

Figure 26:
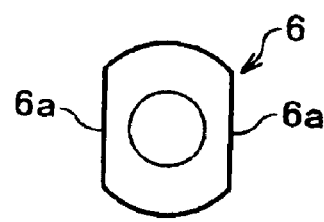
FIGS. 26–32 are schematic diagrams showing differing cross-sectional shapes of a rotation position reference surface according to the present invention.

Column 14,
Line 47, change "FIG. 27" to -- FIG. 26 --.
Line 66, change "6*f*" to -- 6f --.

Column 16,
Line 59, after "projections 4." begin a new paragraph.

Column 19,
Line 32, before "reduction gears" remove -- a --.

Column 20,
Line 56, after "circumference of each" insert -- of the --.
Line 67, after "accommodate" insert -- , --.

Column 21,
Line 1, after "manner" insert -- , --.
Line 25, change "FIG. 6 to FIG. 13." to -- FIGS. 6-13 --.
Line 28, after "alignment" remove "ment".

UNITED STATES PATENT AND TRADEMARK OFFICE
CERTIFICATE OF CORRECTION

PATENT NO. : 6,877,906 B2
DATED : April 12, 2005
INVENTOR(S) : Masato Mizukami et al.

It is certified that error appears in the above-identified patent and that said Letters Patent is hereby corrected as shown below:

<u>Column 23,</u>
Line 16, change "unlocking" to -- unlock --.

Signed and Sealed this

Fourth Day of October , 2005

JON W. DUDAS
*Director of the United States Patent and Trademark Office*

UNITED STATES PATENT AND TRADEMARK OFFICE
CERTIFICATE OF CORRECTION

PATENT NO. : 6,877,906 B2  Page 1 of 1
APPLICATION NO. : 10/648822
DATED : April 12, 2005
INVENTOR(S) : Masato Mizukami et al It is certified that error appears in the above-identified patent and that said Letters Patent is hereby corrected as shown below:

Title Page
Item 73, Assignee, Change "Nippon Telegraph and Telephone" to --Nippon Telegraph and Telephone Corporation--

Signed and Sealed this

Twenty-ninth Day of August, 2006

JON W. DUDAS
*Director of the United States Patent and Trademark Office*